(12) United States Patent
Kinoshita

(10) Patent No.: US 9,118,043 B2
(45) Date of Patent: Aug. 25, 2015

(54) MEMBRANE/ELECTRODE ASSEMBLY FOR POLYMER ELECTROLYTE FUEL CELLS AND POLYMER ELECTROLYTE FUEL CELL

(75) Inventor: Shinji Kinoshita, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 691 days.

(21) Appl. No.: 12/408,519

(22) Filed: Mar. 20, 2009

(65) Prior Publication Data

US 2009/0246592 A1    Oct. 1, 2009

Related U.S. Application Data

(60) Provisional application No. 61/076,468, filed on Jun. 27, 2008.

(30) Foreign Application Priority Data

Mar. 21, 2008    (JP) .................................. 2008-074447

(51) Int. Cl.
*H01M 8/10* (2006.01)
*H01M 8/02* (2006.01)

(52) U.S. Cl.
CPC .......... *H01M 8/0291* (2013.01); *H01M 8/0297* (2013.01); *H01M 8/1004* (2013.01);
(Continued)

(58) Field of Classification Search
CPC ............ H01M 8/0291; H01M 8/0297; H01M 8/1004; H01M 8/1023; H01M 8/1039; H01M 8/106; H01M 8/1062; H01M 8/1067
USPC ......... 429/479, 480, 482, 483, 491, 492, 493, 429/494, 523
See application file for complete search history.

(56) References Cited

U.S. PATENT DOCUMENTS 5,547,551 A    8/1996   Bahar et al.
6,042,958 A    3/2000   Denton et al.
(Continued)

FOREIGN PATENT DOCUMENTS

CN    1536703 A      10/2004
JP    10-312815      11/1998
(Continued)

OTHER PUBLICATIONS

C. Heitner-Wirguin. Recent advances in perfluorinated ionomer membranes: structure, properties and applications, J. Membr. Sci. 1996, 120, 1-33.*

(Continued)

*Primary Examiner* — Carlos Barcena
(74) *Attorney, Agent, or Firm* — Oblon, McClelland, Maier & Neustadt, L.L.P.

(57) ABSTRACT

To provide a membrane/electrode assembly for polymer electrolyte fuel cells, which is capable of providing high power generation performance even under a low humidity condition and has sufficient mechanical strength and dimensional stability, and which has an excellent durability even in an environment where moistening and drying are repeated, and a polymer electrolyte fuel cell which is capable of providing high power generation performance even under a low humidity condition.

A membrane/electrode assembly 10 is used, which comprises a cathode 20 having a catalyst layer 22, an anode 30 having a catalyst layer 32, and a polymer electrolyte membrane 40 interposed between the catalyst layer 22 of the cathode 20 and the catalyst layer 32 of the anode 30, wherein at least one of the cathode 20 and the anode 30 further has a reinforcing layer 26 comprising a porous sheet-form reinforcing material made of a polymer, and an electrically conductive fiber.

33 Claims, 5 Drawing Sheets

(52) U.S. Cl.
CPC .......... *H01M8/106* (2013.01); *H01M 8/1023* (2013.01); *H01M 8/1039* (2013.01); *H01M 8/1062* (2013.01); *H01M 8/1067* (2013.01); *Y02E 60/521* (2013.01)

(56) References Cited

U.S. PATENT DOCUMENTS

| | | | |
|---|---|---|---|
| 6,054,230 A * | 4/2000 | Kato | 429/480 |
| 6,127,474 A * | 10/2000 | Andelman | 524/495 |
| 6,183,898 B1 * | 2/2001 | Koschany et al. | 429/481 |
| 2004/0247986 A1* | 12/2004 | Takeguchi et al. | 429/38 |
| 2005/0260464 A1* | 11/2005 | Raiford et al. | 429/13 |
| 2006/0078784 A1* | 4/2006 | Liu et al. | 429/42 |
| 2006/0286437 A1 | 12/2006 | Aihara et al. | |
| 2007/0137783 A1 | 6/2007 | Fay et al. | |

FOREIGN PATENT DOCUMENTS

| | | | | |
|---|---|---|---|---|
| JP | 2001-57220 | | 2/2001 | |
| JP | 2004-220843 | * | 8/2004 | ............ H01M 4/86 |
| JP | 2004-220843 A | | 8/2004 | |
| JP | 2005-190701 | * | 7/2005 | ............ H01M 4/86 |
| JP | 2005-190701 A | | 7/2005 | |
| JP | 2006-155921 A1 | | 6/2006 | |
| JP | 2006-252967 | | 9/2006 | |
| JP | 2006-286494 A | | 10/2006 | |
| JP | 2006-339124 | | 12/2006 | |
| JP | 2006339124 A | * | 12/2006 | |
| JP | 2007-95433 | | 4/2007 | |
| JP | 2007-157637 | | 6/2007 | |
| JP | 2007-329015 | | 12/2007 | |
| JP | 2008-016431 A | | 1/2008 | |
| JP | 1 927 601 A1 | | 6/2008 | |
| JP | 2008-210725 | | 9/2008 | |
| WO | WO 2007/013533 | | 2/2007 | |
| WO | WO 2008/105337 A1 | | 9/2008 | |

OTHER PUBLICATIONS

Extended Supplementary European Search Report issued on Feb. 3, 2011 in corresponding European Application No. 09 72 2431.
Combined Office Action and Search Report issued Nov. 5, 2012 in Chinese Patent Application No. 200980110600.0 with English language translation.

* cited by examiner

MEMBRANE/ELECTRODE ASSEMBLY FOR POLYMER ELECTROLYTE FUEL CELLS AND POLYMER ELECTROLYTE FUEL CELL

BACKGROUND OF THE INVENTION

1. Field of the Invention

The present invention relates to a membrane/electrode assembly for polymer electrolyte fuel cells, and a polymer electrolyte fuel cell.

2. Discussion of Background

Fuel cells are expected to be widely used, since is their power generation efficiency is high, the reaction product is only water in principle, and the load to the environment is small. Among them, a polymer electrolyte fuel cell has a high output density and is therefore expected to be widely used as an automobile or distributed power generation system, a portable power generation system for a household cogeneration system.

A polymer electrolyte fuel cell is usually constituted by a cell wherein an electrically conductive separator having gas flow paths formed, is disposed on each side of a membrane/electrode assembly comprising a cathode having a catalyst layer and a gas diffusion layer, an anode having a catalyst layer and a gas diffusion layer, and a polymer electrolyte membrane disposed between the catalyst layer of the cathode and the catalyst layer of the anode.

In a case where the dimensional stability or the mechanical strength of the membrane/electrode assembly is low, the handling efficiency is likely to be poor in assembling the cell, or the polymer electrolyte membrane is likely break during its operation. Therefore, the membrane/electrode assembly is required to have sufficient mechanical strength and dimensional stability.

Further, recently, the polymer electrolyte fuel cell is required to be operated under a low humidity condition where the relative humidity of the reaction gas (fuel gas and oxidant gas) is low, in order to simplify the fuel cell system or to reduce the cost. If power generation can be carried out constantly under a low humidity condition, it will be unnecessary to provide a peripheral device such as a humidifying device, whereby it is possible to reduce the size or the costs of the fuel cell system. Accordingly, the polymer electrolyte membrane for the membrane/electrode assembly is required to have a high ion exchange capacity (i.e. the equivalent weight (grams of the polymer per equivalent of ionic groups, hereinafter referred to as EW) being small) and a thin thickness (at most 25 μm) in order to maintain the ion conductivity even under a low humidity condition.

However, the polymer electrolyte membrane has such a nature that as EW is smaller, it tends to undergo swelling and shrinkage due to changes of the humidified environment. Such swelling and shrinkage occur due to changes of the operation conditions such as the cell temperature, the relative humidity of the reaction gas, the amount of the reaction gas, the output, etc., and in a practical application, the polymer electrolyte membrane undergoes dimensional changes disorderly as the swelling and shrinkage are repeated. Consequently, the polymer electrolyte membrane will get wrinkles. And, in a case where the thickness of the polymer electrolyte membrane is thin, the polymer electrolyte membrane may break due to such wrinkles.

The following ones have, for example, been proposed as a polymer electrolyte membrane and a membrane/electrode assembly having the dimensional stability improved.

(1) A thin composite membrane having a thickness of at most about 25 μm having an ion exchange resin impregnated to a stretch-expanded tetrafluoroethylene film having a porous fine structure (Patent Document 1).

(2) A composite membrane having an ion conductive polymer contained in porous bodies of individual fibers randomly oriented (Patent Document 2).

(3) A membrane/electrode assembly having a reinforcing material containing electrically conductive nano fibers disposed on at least one side of a polymer electrolyte membrane (Patent Document 3).

However, the composite membrane (1) has such a problem that as compared with a membrane not reinforced, the ion conductivity tends to be low, and the power generation performance tends to be low particularly under a low humidity condition.

The composite membrane (2) also has a problem such that when a porous material having sufficient chemical stability and mass productivity is selected for use, the ion conductivity tends to be low as compared with the membrane not reinforced, and the power generation performance tends to be low particularly under a low humidity condition.

In the case of the membrane/electrode assembly (3), the dimensional stability and mechanical strength are still inadequate, and it is not durable against the above-mentioned repetition of swelling and shrinkage especially when the thickness of the polymer electrolyte membrane is at most 25 μm.

Patent Document 1: U.S. Pat. No. 5,547,551
Patent Document 2: JP-A-10-312815
Patent Document 3: JP-A-2006-252967

SUMMARY OF THE INVENTION

The present invention is to provide a membrane/electrode assembly for polymer electrolyte fuel cells which is capable of providing high power generation performance even under a low humidity condition and has sufficient mechanical strength and dimensional stability and which has excellent durability even under an environment where moistening, drying, etc. are repeated, and to provide a polymer electrolyte fuel cell which is capable of power generation even under a low humidity condition and whereby a peripheral device such as a humidifying device can be simplified.

The membrane/electrode assembly for polymer electrolyte fuel cells of the present invention comprises a cathode having a catalyst layer, an anode having a catalyst layer, and a polymer electrolyte membrane interposed between the catalyst layer of the cathode and the catalyst layer of the anode, wherein at least one of the cathode and the anode further has a reinforcing layer comprising a porous sheet-form reinforcing material made of a polymer, and an electrically conductive fiber.

It is preferred that each of the cathode and the anode further has a gas diffusion layer, and the reinforcing layer is present between the catalyst layer and the gas diffusion layer.

It is preferred that the reinforcing layer contains a binder, and the binder is a fluorinated ion exchange resin.

It is preferred that the mass ratio of the electrically conductive fiber to the binder (electrically conductive fiber/binder) is from 1/0.05 to 1/1.

It is preferred that the electrically conductive fiber is a carbon fiber, and the carbon fiber has an average fiber diameter of from 50 to 300 nm and an average fiber length of from 5 to 30 μm.

It is preferred that the sheet-form reinforcing material has a plurality of pores and has an average pore diameter of from 0.4 to 7 μm.

It is preferred that the sheet-form reinforcing material is made of a plurality of fibers, and the fibers have an average fiber diameter of from 0.2 to 7 μm.

It is preferred that the sheet-form reinforcing material is a non-woven fabric, and the non-woven fabric is a non-woven fabric made of a polypropylene or a fluoropolymer, produced by a melt-blown method.

It is preferred that the sheet-form reinforcing material is a porous film made of a polytetrafluoroethylene.

It is preferred that the membrane/electrode assembly of the present invention further has an interlayer in contact with the reinforcing layer.

It is preferred that the polymer electrolyte membrane has a thickness of from 10 to 30 μm.

It is preferred that the polymer electrolyte membrane has an equivalent weight (EW) of at most 900 g/equivalent.

It is preferred that the polymer electrolyte membrane is a polymer electrolyte membrane made of a polymer (Q) which has repeating units represented by the following formula (U1) and repeating units represented by the formula (U2) and which has an equivalent weight of from 400 to 900 g/equivalent:

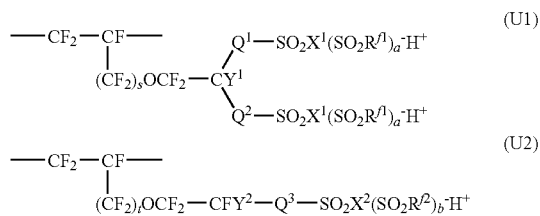

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

It is preferred that the 90° peel strength at all interfaces present between the polymer electrolyte membrane and the reinforcing layer is at least 0.5 N/cm.

The membrane/electrode assembly of the present invention may further has a frame-form sub-gasket disposed at the periphery of the membrane/electrode assembly for polymer electrolyte fuel cells.

The polymer electrolyte fuel cell of the present invention is a polymer electrolyte fuel cell having the membrane/electrode assembly for polymer electrolyte fuel cells of the present invention, wherein power generation is carried out by feeding a reaction gas having a relative humidity of at most 25%.

The membrane/electrode assembly for polymer electrolyte fuel cells of the present invention is capable of providing high power generation performance even under a low humidity condition and has sufficient mechanical strength and dimensional stability, and it has excellent durability even in an environment where moistening, drying, etc. are repeated.

The polymer electrolyte fuel cell of the present invention is capable of constant power generation even under a low humidity condition, whereby a peripheral device such as a humidifying device can be simplified, and it is thus advantageous for reduction of the size and the costs.

DETAILED DESCRIPTION OF PREFERRED EMBODIMENTS

In this specification, repeating units represented by the formula (1) will be referred to as units (1). The same applies to repeating units represented by other formulae. The repeating units mean units derived from a monomer, formed by polymerization of such a monomer. The repeating units may be units formed directly by a polymerization reaction, or may be such that some of such units are converted to another structure by treatment of the polymer.

Further, in this specification, a compound represented by the formula (2) will be referred to as a compound (2). The same applies to compounds represented by other formulae.

Membrane/Electrode Assembly

In the membrane/electrode assembly for polymer electrolyte fuel cells (hereinafter referred to as the membrane/electrode assembly) of the present invention, at least one of the cathode and the anode has a reinforcing layer, and by this reinforcing layer, the polymer electrolyte membrane is reinforced from outside, whereby while sufficiently suppressing the dimensional change of the polymer electrolyte membrane, it is possible to improve the power generation characteristics by suppressing an increase of electrical resistance as compared with a case where the polymer electrolyte membrane is reinforced from inside. Particularly, it is possible to increase the power generation characteristics under a low humidity condition.

Figure 1:
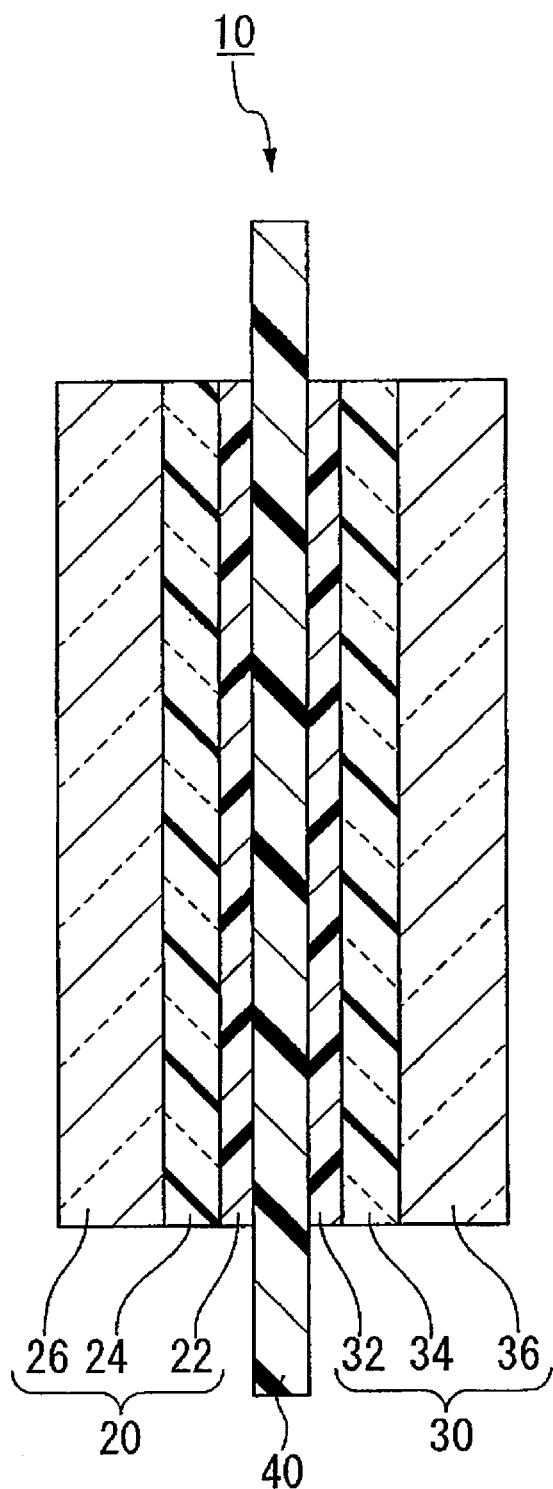
FIG. 1 is a cross-sectional view illustrating one embodiment of the membrane/electrode assembly of the present invention.

FIG. 1 is a cross-sectional view illustrating an embodiment of the membrane/electrode assembly for polymer electrolyte fuel cells of the present invention. The membrane/electrode assembly 10 comprises a cathode 20 having a catalyst layer 22, a reinforcing layer 24 and a gas diffusion layer 26 in this order; an anode 30 having a catalyst layer 32, a reinforcing layer 34 and a gas diffusion layer 36 in this order; and a polymer electrolyte membrane 40 disposed between the catalyst layer 22 of the cathode 20 and the catalyst layer 32 of the anode 30.

Catalyst Layer

The catalyst layer 22 or the catalyst layer 32 (hereinafter generally referred to as a catalyst layer) is a layer comprising a catalyst and an ion exchange resin. The catalyst layer 22 and the catalyst layer 32 may be layers having the same components, composition, thickness, etc. or different layers.

The catalyst may be any catalyst so long as it is one to accelerate an oxidation/reduction reaction in a fuel cell, and it is preferably a catalyst containing platinum, particularly preferably a supported catalyst having platinum or a platinum alloy supported on a carbon carrier.

The carbon carrier may, for example, be activated carbon or carbon black, and it is preferably graphitized by e.g. heat treatment, since its chemical durability is high.

The specific surface area of the carbon carrier is preferably at least 200 m²/g. The specific surface area of the carbon carrier is measured by a BET specific surface area device by adsorption of nitrogen on a carbon surface.

The platinum alloy is preferably an alloy of platinum with at least one metal selected from the group consisting of platinum group metals excluding platinum (such as ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum and a metal to be alloyed with platinum.

The amount of platinum or a platinum alloy supported is preferably from 10 to 70 mass %, based on the supported catalyst (100 mass %).

The ion exchange resin is preferably a fluorinated ion exchange resin, more preferably a perfluorocarbon polymer having ionic groups (which may contain an etheric oxygen atom), from the viewpoint of the durability. As such a perfluorocarbon polymer, polymer (H) or polymer (Q) is preferred, and polymer (Q) is particularly preferred.

Polymer (H):

The polymer (H) is a copolymer having units based on tetrafluoroethylene (hereinafter referred to as TFE) and units (1).

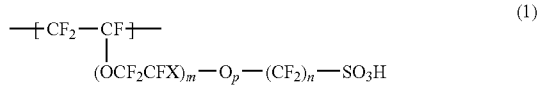

(1)

wherein X is a fluorine atom or a trifluoromethyl group, m is an integer of from 0 to 3, n is an integer of from 1 to 12, and p is 0 or 1.

The polymer (H) is obtainable by polymerizing a mixture of TFE and the compound (2) to obtain a precursor polymer (hereinafter referred to as polymer (F)), and then converting the —SO₂F groups in the polymer (F) to sulfonic acid groups. The conversion of the —SO₂F groups to the sulfonic acid groups is carried out by hydrolysis and treatment for conversion to an acid-form.

$$CF_2=CF(OCF_2CFX)_m-O_p-(CF_2)_n-SO_2F \quad (2)$$

wherein X is a fluorine atom or a trifluoromethyl group, m is an integer of from 0 to 3, n is an integer of from 1 to 12, and p is 0 or 1.

As the compound (2), compounds (2-1) to (2-3) are preferred.

$$CF_2=CFO(CF_2)_{n1}SO_2F \quad (2-1)$$

$$CF_2=CFOCF_2CF(CF_3)O(CF_2)_{n2}SO_2F \quad (2-2)$$

$$CF_2=CF(OCF_2CF(CF_3))_{m3}O(CF_2)_{n3}SO_2F \quad (2-3)$$

wherein each of n1, n2 and n3 is an integer of from 1 to 8, and m3 is an integer of from 1 to 3.

Polymer (Q):

The polymer (Q) is a copolymer having units (U1) and units (U2).

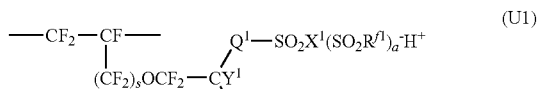

(U1)

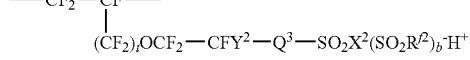

(U2)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is a hydrogen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

The single bond means that the carbon atom of $CY^1$ or $CY^2$ is directly bonded to the sulfur atom of $SO_2$.

The organic group means a group containing at least one carbon atom.

Units (U1):

In a case where the perfluoroalkylene group for $Q^1$ or $Q^2$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be linear or branched, preferably linear. The number of carbon atoms in the perfluoroalkylene group is preferably from 1 to 6, more preferably from 1 to 4. When the number of carbon atoms is at most 6, the boiling point of the fluoromonomer as the starting material tends to be low, whereby purification by distillation will be easy. Further, when the number of carbon atoms is at most 6, it is possible to suppress an increase of the equivalent weight of the polymer (Q) and to suppress a decrease of the proton conductivity.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, the polymer electrolyte fuel cell will be excellent in the stability of the power generation performance when it is operated over a long period, as compared with a case where $Q^2$ is a single bond.

It is preferred that at least one of $Q^1$ and $Q^2$ is a $C_{1-6}$ perfluoroalkylene group having an etheric oxygen atom. The fluorinated monomer having a $C_{1-6}$ perfluoroalkylene group having an etheric oxygen atom can be synthesized without a fluorination reaction by fluorine gas, whereby the yield is good, and the production is easy.

The perfluoroalkyl group for $R^{f1}$ may be linear or branched, preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

In a case where units (U1) have at least two $R^1$, the plurality of $R^{f1}$ may be the same or different from one another.

The $-(SO_2X^1(SO_2R^{f1})_a)^-H^+$ group is an ionic group.

The $-(SO_2X^1(SO_2R^{f1})_a)^-H^+$ group may, for example, be a sulfonic acid group ($-SO_3^-H^+$ group), a sulfonimide group ($-SO_2N(SO_2R^{f1})^-H^+$ group), or a sulfonmethide group ($-SO_2C(SO_2R^{f1})_2)^-H^+$ group).

$Y^1$ is preferably a fluorine atom or a $C_{1-6}$ linear perfluoroalkyl group which may have an etheric oxygen atom.

Units (U1) are preferably units (M1), more preferably units (M11), units (M12) or units (M13), since production of the polymer (Q) is thereby easy, and industrial application is easy.

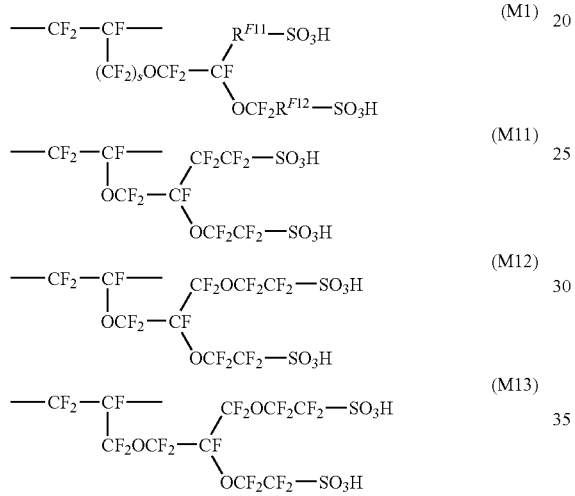

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

Units (U2):

In a case where the perfluoroalkylene group for $Q^3$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be liner or branched.

The number of carbon atoms in the perfluoroalkylene group is preferably from 1 to 6, more preferably from 1 to 4. When the number of carbon atoms is at most 6, an increase of the equivalent weight of the polymer (Q) can be suppressed, and a decrease of the proton conductivity can be suppressed.

The perfluoroalkyl group for $R^{f2}$ may be linear or branched, preferably linear.

The number of carbon atoms in the perfluoroalkyl group is preferably from 1 to 6, more preferably from 1 to 4. The perfluoroalkyl group is preferably, for example, a perfluoromethyl group or a perfluoroethyl group.

The $-(SO_2X^2(SO_2R^{f2})_b)^-H^+$ group is an ionic group.

The $-(SO_2X^2(SO_2R^{f2})_b)^-H^+$ group may, for example, be a sulfonic acid group ($-SO_3^-H^+$ group), a sulfonimide group ($-SO_2N(SO_2R^{f2})^-H^+$ group), or a sulfonmethide group ($-SO_2C(SO_2R^{f2})_2)^-H^+$ group)

$Y^2$ is preferably a fluorine atom or a trifluoromethyl group.

Units (U2) are preferably units (M2), more preferably units (M21), units (M22), units (M23) or units (M24) from such a viewpoint that production of the polymer (Q) is easy, and an industrial application is easy.

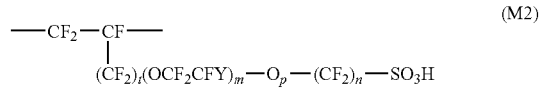
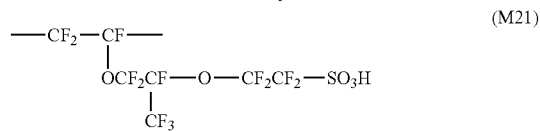
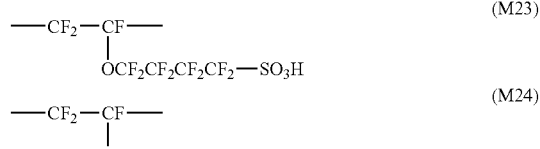

wherein Y is a fluorine atom or a trifluoromethyl group, m is an integer of from 0 to 3, n is an integer of from 1 to 12, and p is 0 or 1, provided that m+p>0.

Other Units:

The polymer (Q) may further have repeating units based on the after-described other monomers (hereinafter referred to as other units). The proportion of such other units may suitably be adjusted so that the equivalent weight of the polymer (Q) will be within the after-mentioned preferred range.

Such other units are preferably repeating units based on a perfluoromonomer, more preferably repeating units based on TFE, from the viewpoint of mechanical strength and chemical durability.

The proportion of repeating units based on TFE is preferably at least 20 mol %, more preferably at least 40 mol %, based on the total repeating units (100 mol %) constituting the polymer (Q), from the viewpoint of the mechanical strength and chemical durability.

The proportion of repeating units based on TFE is preferably at most 92 mol %, more preferably at most 87 mol %, based on the total repeating units (100 mol %) constituting the polymer (Q) from the viewpoint of the electrical resistance.

The polymer (Q) may have units (U1), units (U2) and other units, each being one type only, or two or more types. The polymer (Q) is preferably a perfluoropolymer from the viewpoint of the chemical durability.

The equivalent weight of the polymer (Q) (grams of polymer per equivalent of ionic groups, hereinafter referred to as EW) is preferably from 400 to 900 g·dry resin/equivalent (hereinafter referred to as g/equivalent), more preferably from 500 to 800 g/equivalent, further preferably from 550 to 780 g/equivalent, particularly preferably from 580 to 750 g/equivalent. When EW is at most 900 g/equivalent, the proton conductivity will be high (the electrical resistance will be low), whereby a sufficient cell output can be obtained. When EW is at least 400 g/equivalent, it is easy to synthesize a polymer having a high molecular weight, or the polymer (Q) will not be excessively swelled with water, whereby the mechanical strength can be maintained.

EW of a polymer which has been heretofore commonly used is at a level of from 900 to 1,100 g/equivalent from the balance of the electrical resistance and the mechanical strength. On the other hand, with the polymer (Q), the mechanical strength can be maintained even when the electrical resistance is lowered by reducing EW.

When the proportion of units (U2) in the polymer (Q) is represented by units (U2)/(units (U1)+units (U2)) (molar ratio), it is preferably from 0.2/1 to 0.7/1, more preferably from 0.25/1 to 0.6/1, further preferably from 0.3/1 to 0.55/1. When the proportion of units (U2) is at least 0.2/1, the durability against repetition of moistening and drying will be high, and the polymer electrolyte fuel cell will be operated constantly over a long period of time. When the proportion of units (U2) is at most 0.7/1, the water content will not be too high, or the softening point and the glass transition temperature will not be too low, whereby the mechanical strength can be maintained.

The mass average molecular weight of the polymer (Q) is preferably from $1\times10^4$ to $1\times10^7$, more preferably from $5\times10^4$ to $5\times10^6$, further preferably from $1\times10^5$ to $3\times10^6$. When the mass average molecular weight of the polymer (Q) is at least $1\times10^4$, the physical properties such as the swelling degree, etc. will scarcely change with time, and the durability will be sufficient. When the mass average molecular weight of the polymer (Q) is at most $1\times10^7$, dissolution and molding will be easy.

The mass average molecular weight of the polymer (Q) can be evaluated by measuring the TQ value of the precursor polymer having the —SO$_2$F groups. The TQ value (unit: ° C.) is an index of the molecular weight of a polymer and is a temperature when the extruded amount would be 100 mm$^3$/sec when melt extrusion of the precursor polymer is carried out under an extrusion pressure condition of 2.94 MPa by using a nozzle having a length of 1 mm and an inner diameter of 1 mm. For example, with a polymer having a TQ value of from 200 to 300° C., its mass average molecular weight corresponds to from $1\times10^5$ to $1\times10^6$, although it may vary depending upon the composition of repeating units constituting the polymer.

Process for Producing Polymer (Q):

The polymer (Q) may be produced, for example, via the following steps.

(i) A step of polymerizing a compound (u1), a compound (u2) and, if necessary, other monomers to obtain a precursor polymer having —SO$_2$F groups (hereinafter referred to as a polymer (P)).

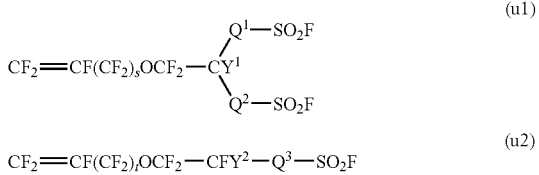

(ii) A step of contacting the polymer (P) with fluorine gas to fluorinate unstable terminal groups of the polymer (P), as the case requires.

(iii) A step of converting —SO$_2$F groups in the polymer (P) to sulfonic acid groups, sulfonimide groups or sulfonmethide groups thereby to obtain the polymer (Q).

Step (i):

As the compound (u1), a compound (m1) is preferred, and a compound (m11), a compound (m12) or a compound (m13) is more preferred.

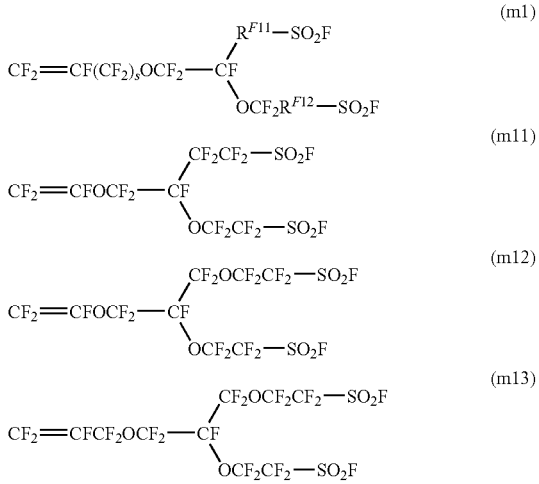

The compound (m1) may be produced, for example, via the following synthesis route.

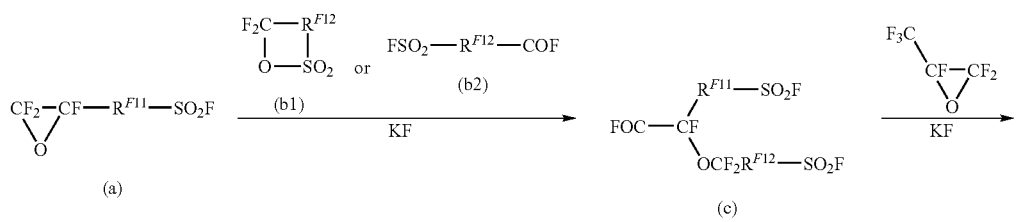

-continued $$\text{FOC-CFOCF}_2-\underset{\underset{\text{CF}_3}{|}}{\text{CF}}\underset{\text{OCF}_2\text{R}^{F12}-\text{SO}_2\text{F}}{\overset{\text{R}^{F11}-\text{SO}_2\text{F}}{\diagup}} \xrightarrow{\Delta} \text{CF}_2=\text{CFOCF}_2-\text{CF}\underset{\text{OCF}_2\text{R}^{F12}-\text{SO}_2\text{F}}{\overset{\text{R}^{F11}-\text{SO}_2\text{F}}{\diagup}}$$

(d)          (m1) (s = 0)

$$\downarrow \text{CF}_2=\text{CFCF}_2\text{OSO}_2\text{F}$$

$$\text{CF}_2=\text{CFCF}_2\text{OCF}_2-\text{CF}\underset{\text{OCF}_2\text{R}^{F12}-\text{SO}_2\text{F}}{\overset{\text{R}^{F11}-\text{SO}_2\text{F}}{\diagup}}$$

(m1) (S = 1)

As the compound (u2), a compound (m2) is preferred, and a compound (m21), a compound (m22), a compound (m23) or a compound (m24) is more preferred.

$$CF_2=CF(CF_2)_t(OCF_2CFY)_m-O_p-(CF_2)_n-SO_2F \quad (m2)$$

$$CF_2=CFOCF_2CF-O-CF_2CF_2-SO_2F \quad (m21)$$
$$\qquad\qquad\qquad |$$
$$\qquad\qquad\quad CF_3$$

$$CF_2=CFOCF_2CF_2-SO_2F \quad (m22)$$

$$CF_2=CFOCF_2CF_2CF_2CF_2-SO_2F \quad (m23)$$

$$CF_2=CFCF_2OCF_2CF_2-SO_2F \quad (m24)$$

The compound (u2) may be produced, for example, by a known preparation method such as a method disclosed by D. J. Vaugham, "Du Pont Inovation", vol. 43, No. 3, 1973, p. 10, or a method disclosed in Examples in U.S. Pat. No. 4,358, 412.

Other monomers may, for example, be TFE, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as a perfluoro(alkyl vinyl ether) or a perfluoro (an etheric oxygen atom-containing alkyl vinyl ether)).

As the perfluorovinyl ether, a compound (m3) is preferred, and a compound (m31), a compound (m32) or a compound (m33) is more preferred.

$$CF_2=CF-(OCF_2CFZ)_u-O-R^f \quad (m3)$$

$$CF_2=CF-O-(CF_2)_vCF_3 \quad (m31)$$

$$CF_2=CF-OCF_2CF(CF_3)-O-(CF_2)_wCF_3 \quad (m32)$$

$$CF_2=CF-(OCF_2CF(CF_3))_x-O-(CF_2)_2CF_3 \quad (m33)$$

In the above formulae, Z is a fluorine atom or a trifluoromethyl group, $R^f$ is a linear or branched $C_{1-12}$ perfluoroalkyl group, u is an integer of from 0 to 3, v is an integer of from 1 to 9, w is an integer of from 1 to 9, and x is 2 or 3.

Among other monomers, a perfluoromonomer is preferred, and TFE is more preferred from the viewpoint of the mechanical strength and chemical durability.

The polymerization method may, for example, be a known polymerization method such as a bulk polymerization method, a solution polymerization method, a suspension polymerization method or a emulsion polymerization method. Further, polymerization may be carried out in a liquid or in a supercritical carbon dioxide.

The polymerization is carried out under conditions under which radicals will form. As a method of forming radicals, irradiation with radiation rays such as ultraviolet rays, y-rays or electron rays, or addition of a radical initiator may, for example, be mentioned.

The polymerization temperature is usually from 10 to 150° C.

The radical initiator may, for example, be a bis(fluoroacyl) peroxide, a bis(chlorofluoroacyl)peroxide, a dialkyl peroxydicarbonate, a diacyl peroxide, a peroxyester, an azo compound or a persulfate, and a perfluoro compound such as a bis(fluoroacyl)peroxide is preferred, since it is thereby possible to obtain a polymer F containing little unstable terminal groups.

As a solvent to be used for the solution polymerization, a solvent having a boiling point of from 20 to 350° C. is preferred, and a solvent having a boiling point of from 40 to 150° C. is more preferred. The solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1H-perfluorohexane), a hydrochlorofluorocarbon (such as 3,3-dichloro-1,1,1,2,2-pentafluoropropane or 1,3-dichloro-1, 1,2,2,3-pentafluoropropane).

In the solution polymerization method, a monomer, a radical initiator, etc., are added into a solvent, and polymerization of the monomer is carried out by letting radicals form in the solvent. The addition of the monomer may be all at once or sequential addition, or it may be continuous addition.

In the suspension polymerization method, water is used as a dispersing medium, and into the dispersing medium, a monomer, a nonionic radical initiator, etc. are added, and polymerization of the monomer is carried out by letting radicals form in the dispersing medium.

The nonionic radical initiator may, for example, be a bis (fluoroacyl)peroxide, a bis(chlorofluoroacyl)peroxide, a dialkyl peroxydicarbonate, a diacyl peroxide, a peroxyester, a dialkyl peroxide, a bis(fluoroalkyl)peroxide or an azo compound.

To the dispersing medium, the above solvent as an assisting agent; a surfactant as a dispersion stabilizer to prevent agglomeration of suspended particles; a hydrocarbon compound (such as hexane or methanol) as a molecular weight-adjusting agent, etc., may be added.

Step (ii):

Unstable terminal groups may, for example, be groups formed by a chain transfer reaction, groups based on the radical initiator, etc. Specifically, they may, for example, be —COOH groups, —CF=CF$_2$ groups, —COF groups or —CF$_2$H groups. By fluorinating or stabilizing such unstable terminal groups, decomposition of the polymer (Q) is suppressed, and the durability will be improved.

When unstable terminal groups are to be fluorinated by fluorine gas, the fluorine gas may be used as diluted with an inert gas such as nitrogen, helium or carbon dioxide, or it may be used as it is, without dilution.

The temperature at the time of contacting the polymer (P) with fluorine gas is preferably from room temperature to 300° C., more preferably from 50 to 250° C., further preferably from 100 to 220° C., particularly preferably from 150 to 200° C.

The time for contacting the polymer (P) with fluorine gas is preferably from one minute to one week, more preferably from 1 to 50 hours.

Step (iii):

For example, in a case where —SO$_2$F groups are converted to sulfonic acid groups, step (iii-1) is carried out, and in a case where —SO$_2$F groups are converted to sulfonimide groups, step (iii-2) is carried out.

(iii-1) —SO$_2$F groups in the polymer (P) are hydrolyzed to sulfonate groups, and the sulfonate groups are converted to an acid form to form sulfonic acid groups.

(iii-2) —SO$_2$F groups in the polymer (P) are imidated to salt-form sulfonimide groups (—SO$_2$NMSO$_2$R$^{f1}$ groups) (wherein M is an alkali metal or primary to quaternary ammonium), and further converted to an acid form to obtain acid-form sulfonimide groups (—SO$_2$NHSO$_2$R$^{f1}$ groups).

Step (iii-1):

The hydrolysis is carried out, for example, by contacting the polymer (P) with a basic compound in a solvent.

The basic compound may, for example, be sodium hydroxide or potassium hydroxide. The solvent may, for example, be water or a solvent mixture of water and a polar solvent. The polar solvent may, for example, be an alcohol (such as methanol or ethanol) or dimethylsulfoxide.

The conversion to an acid form may be carried out, for example, by contacting the polymer having sulfonate groups with an aqueous solution of hydrochloric acid, sulfuric acid or the like.

The hydrolysis and conversion to an acid form are carried out usually at a temperature of from 0 to 120° C.

Step (iii-2):

The imidation is carried out by the following methods.

(iii-2-1) A method of reacting —SO$_2$F groups with R$^{f1}$SO$_2$NHM.

(iii-2-2) A method of reacting —SO$_2$F groups with R$^{f1}$SO$_2$NH$_2$ in the presence of an alkali metal hydroxide, an alkali metal carbonate, MF, ammonia or a primary to tertiary amine.

(iii-2-3)) A method of reacting —SO$_2$F groups with R$^{f1}$S$_2$NMSi(CH$_3$)$_3$.

The conversion to an acid form is carried out by treating the polymer having salt-form sulfonimide groups, with an acid (such as sulfuric acid, nitric acid or hydrochloric acid).

Further, the polymer (Q) wherein ionic groups are sulfonimide groups, may be produced also by polymerizing a compound (u1') having —SO$_2$F groups in the compound (u1) converted to sulfonimide groups and a compound (u2'), having —SO$_2$F groups in the compound (u2) converted to sulfonimide groups, if necessary with other monomers.

The compound (u1') or (u2') may be produced by adding chlorine or bromine to an unsaturated bond of the compound (u1) or (u2) and converting —SO$_2$F groups to sulfonimide groups in the same manner as in step (iii-2), followed by a dechlorination or debromination reaction by means of metallic zinc.

The polymer (Q) as described above has units (U1) and units (U2), whereby the electrical resistance is low, and it has a higher softening point than a conventional ion exchange resin and higher flexibility. The reason is as follows.

The units (U1) have two ionic groups as its side chains, whereby the mobility of the side chains is low as compared with the units (U2) having one ionic group in its side chain. Accordingly, the softening point of the polymer (Q) having such units (U1) and units (U2) is considered to be high as compared with a polymer having the units (U2) and no units (U1). Further, the side chain of the units (U2) has an effect to increase the flexibility of the main chain of the polymer, whereby the polymer (Q) having both units (U1) and units (U2) is considered to have high flexibility as compared with a polymer having the units (U1) and no units (U2).

In the catalyst layer, the mass ratio of the catalyst to the fluorinated ion exchange resin (electrode catalyst/fluorinated ion exchange resin) is preferably from 4/6 to 9.5/0.5 (mass ratio), particularly preferably from 6/4 to 8/2, from the viewpoint of the electrical conductivity and water repellency.

The amount of platinum contained in the catalyst layer is preferably from 0.01 to 0.5 mg/cm$^2$ from the viewpoint of the optimum thickness to carry out the electrode reaction efficiently, more preferably from 0.05 to 0.35 mg/cm$^2$ from the viewpoint of the balance of the cost of materials and the performance.

The thickness of the catalyst layer is preferably at most 20 µm, more preferably from 1 to 15 µm, with a view to facilitating the gas diffusion in the catalyst layer and improving the power generation performance of the polymer electrolyte fuel cell. Further, the thickness of the catalyst layer is preferably uniform. If the thickness of the catalyst layer is made thin, the amount of the catalyst present per unit area decreases, and the reaction activity is likely to be low. In such a case, a supported catalyst may be employed wherein platinum or a platinum alloy is supported at a high supported ratio, even if the thickness is thin, it is possible to maintain the reaction activity of the electrode to be high without deficiency of the catalyst amount.

The thickness of the catalyst layer is measured by observing a cross section of the catalyst layer by e.g. SEM (scanning electron microscope).

The catalyst layer may contain a water repellent agent with a view to improving the effect to suppress flooding.

The water repellent agent may, for example, be a copolymer of TFE with hexafluoropropylene, a copolymer of TFE with a perfluoro(alkyl vinyl ether), or a polytetrafluoroethylene (hereinafter referred to as PTFE). As the water repellent agent, a fluoropolymer which can be dissolved in a solvent, is preferred from such a viewpoint that a catalyst layer can easily be treated for water repellency.

The amount of the water repellent agent is preferably from 0.01 to 30 mass % in the catalyst layer (100 mass %).

Reinforcing Layer

The reinforcing layer 24 or the reinforcing layer 34 (hereinafter generally referred to also as the reinforcing layer) is a layer comprising a porous sheet-form reinforcing material made of a polymer and an electrically conductive fiber, and, if necessary, a binder. The reinforcing layer 24 and the reinforcing layer 34 may be layers having the same components, composition, thickness, etc., or different layers.

In the reinforcing layer, a porous sheet-form reinforcing material made of a polymer is disposed inside, whereby the mechanical strength is high, and inside of the porous sheet-form reinforcing material, the electrically conductive fiber is filled with spaces, and the electrically conductive fiber is present also on the surface of the sheet-form reinforcing material, whereby it has both electrical conductivity and gas diffusing property. It is preferred that the electrically conductive fiber is present over at least 1% of the surface area of the reinforcing layer, and it may be an interlayer which is described hereinafter.

The polymer constituting the sheet-form reinforcing material may, for example, be a polypropylene, a polyethylene, a polyphenylene sulfide, nylon, a polyamide, PTFE, a TFE/perfluoro(alkyl vinyl ether) copolymer (hereinafter referred to as PFA), an ethylene/TFE copolymer (hereinafter referred to as ETFE), a TFE/hexafluoropropylene copolymer (hereinafter referred to as FEP), a polychlorotrifluoroethylene (PCTFE), an ethylene/chlorotrifluoroethylene copolymer (ECTFE), a polyvinylidene fluoride polymer (hereinafter referred to as PVDF), a polyvinyl fluoride polymer (PVF), a copolymer comprising a plurality of monomer units constituting such polymers, or a blend of such polymers. Further, the blend of such polymers may have electrical conductivity.

The sheet-form reinforcing material may be in the form of a woven fabric, a non-woven fabric, a foamed product, a porous film or the like.

As the porous film, a porous film made of PTFE is preferred. The porous film made of PTFE is produced by stretching a PTFE film. By such a method, it is possible to produce a thin film of at most 100 µm, which is excellent in the mass production and the production cost.

As the non-woven fabric, a non-woven fabric produced by a melt blown method or an electrospinning method is preferred. By the melt blown method, it is possible to produce a non-woven fabric with fine fiber having a fiber diameter of at most about 10 µm, and it is excellent also in the productivity. The polymer to be used for the melt blown method may, for example, be a polypropylene or a fluoropolymer (such as ETFE or FEP), and a fluoropolymer is preferred. By the electrospinning method, it is possible to produce a non-woven fabric with fine fiber having a fiber diameter of at most about 1 µm, and it is excellent also in the productivity. The polymer to be used for the electrospinning method may, for example, be a polyamide, PVDF or nylon.

With respect to a sheet-form reinforcing material made of a plurality of fibers, the average fiber diameter is preferably from 0.2 to 7 µm, more preferably from 0.3 to 5 µm. Within such a range, a sufficient reinforcing effect, gas diffusion property and water-discharging property can be maintained.

The average fiber diameter of the sheet-form reinforcing material is measured by observing the surface by means of e.g. SEM.

With respect to the sheet-form reinforcing material not constituted by fibers, such as a porous sheet prepared by a stretching method, the average pore diameter is preferably from 0.4 to 7 µm, more preferably from 0.8 to 5 µm. Within such a range, a sufficient reinforcing effect, gas diffusion property and water-discharging property can be maintained.

The average pore diameter of the sheet-form reinforcing material may be measured by a bubble point method (JIS K3832).

The thickness of the sheet-form reinforcing material preferably from 5 to 300 µm, more preferably from 10 to 80 µm. Within such a range, a sufficient reinforcing effect, gas diffusion property and water-discharging property can be maintained.

The thickness of the sheet-form reinforcing material is determined by measuring thicknesses at four portions by means of a Digimatic Indicator (543-250, manufactured by MITUTOYO CORPORATION, flat measuring terminal: 5 mm in diameter) and calculating their average.

The electrically conductive fiber is entangled with an electron conductive material (platinum or a platinum alloy, or a carbon carrier) contained in the catalyst layer at the surface of the reinforcing layer, whereby a new conductive path will be formed in addition to a conductive path by point contact of the electron conductive material one another, whereby the electron conductivity at the interface with the catalyst layer will be improved. Further, also in a case where it is in contact with the gas diffusion layer, entangling with the electron conductive material constituting the gas diffusion layer is likely to occur, whereby the electron conductivity at the interface with the gas diffusion layer will be improved.

As the electrically conductive fiber, carbon fiber or the like may be mentioned, and one graphitized by e.g. heat treatment is preferred from such a viewpoint that the chemical durability is high.

As the carbon fiber, carbon nanofiber is preferred, since it is fine, and its electron conductivity is high. The carbon nanofiber may, for example, be carbon fiber grown in gas phase or carbon nanotube (such as single wall, double wall, multi-wall or cup lamination type).

The average fiber diameter of the carbon fiber is preferably from 50 to 500 nm, more preferably from 50 to 300 nm. The average fiber length of the carbon fiber is preferably from 1 to 50 µm, more preferably from 5 to 30 µm. In such a range, the carbon fiber is mutually entangled to form spaces, whereby spaces of the porous body will not be embedded, whereby a high gas diffusion property will be maintained. It is especially preferred that the average fiber diameter of the carbon fiber is from 50 to 300 and the average fiber length of the carbon fiber is from 5 to 30 µm.

The fiber diameter and the fiber length of the carbon fiber are measured by observation by means of an optical microscope, SEM, TEM (transmission type electron microscope). The fiber diameter and the fiber length of the carbon nanofiber represent the average fiber diameter and the average fiber length of the carbon nanofiber, respectively.

The binder is a component to prevent falling of the electrically conductive fiber from the sheet-form reinforcing material. As such a binder, a polymer is preferred, an ion exchange resin is more preferred, and a fluorinated ion exchange resin is further preferred. As the fluorinated ion exchange resin, a perfluorocarbon polymer having ionic groups (which may contain an etheric oxygen atom) is preferred, and the polymer (H) or the polymer (Q) is particularly preferred.

The mass ratio of the electrically conductive fiber to the binder (electrically conductive fiber/binder) is preferably from 1/0.05 to 1/1, more preferably from 1/0.1 to 1/0.7. Within such a range, the dispersibility when the electrically conductive fiber is packed into the porous sheet-form reinforcing material, the gas diffusing property of the reinforcing layer, the bonding between the sheet-form reinforcing material and the electrically conductive fiber, and the water-discharging property will be good.

The thickness of the reinforcing layer is preferably from 12 to 250 µm, more preferably from 20 to 100 µm. Within such a range, a sufficient reinforcing effect, gas diffusion property and water-discharging property can be maintained.

The thickness of the reinforcing layer may be measured by observing a cross section of the reinforcing layer by e.g. SEM.

The membrane/electrode assembly of the present invention is not limited to ones shown in the drawings. For example, it may be a membrane/electrode assembly wherein one of the cathode 20 and the anode 30 has a reinforcing layer, and the other has no reinforcing layer. From the viewpoint of the dimensional stability, it is preferred to provide the reinforcing layer to each of the cathode 20 and the anode 30.

Gas Diffusion Layer

The gas diffusion layer 26 or the gas diffusion layer 36 (hereinafter generally referred to also as the gas diffusion layer) may, for example, be a gas diffusing substrate such as a carbon paper, a carbon cloth or a carbon felt.

In a case where the gas diffusion layer is provided in the membrane/electrode assembly of the present invention, it is possible to prevent by the reinforcing layer such a physical damage that fibers, etc. constituting the gas diffusion layer pierce into the polymer electrolyte membrane. It is thereby possible to suppress short-circuiting of the membrane/electrode assembly and to improve the durability of the membrane/electrode assembly.

Further, by the presence of the reinforcing layer between the catalyst layer and the gas diffusion layer, it is possible to prevent a physical damage by fibers, etc. constituting the gas diffusion layer to both the catalyst layer and the polymer electrolyte membrane, and it is thereby possible to further suppress short circuiting of the membrane/electrode assembly and to further improve the durability of the membrane/electrode assembly.

The surface of the gas diffusion layer is preferably treated for water repellency by a solution or dispersion containing a water repellent fluoropolymer. By such water repellent treatment, water formed in the catalyst layer 22 of the cathode 20 tends to scarcely clog the pores of the gas diffusion layer 26, whereby deterioration of the gas diffusion property can be suppressed.

The surface of the gas diffusion layer is more preferably treated for water repellency by a dispersion containing a water repellent fluoropolymer and electrically conductive carbon from the viewpoint of the electrical conductivity of the membrane/electrode assembly.

The water repellent fluoropolymer may, for example, be PTFE. The electrically conductive carbon may, for example, be carbon black.

The surface of the gas diffusion layer treated for water repellency is in contact with the catalyst layer, the reinforcing layer or the after-mentioned interlayer.

The thickness of the gas diffusion layer is preferably from 100 to 400 μm, more preferably from 120 to 300 μm.

For the thickness of the gas diffusion layer, thicknesses at four portions are measured by means of a Digimatic Indicator (543-250, manufactured by MITUTOYO CORPORATION, flat measuring terminal: 5 mm in diameter), and they are averaged to obtain the thickness of the gas diffusion layer.

Interlayer

Figure 2:
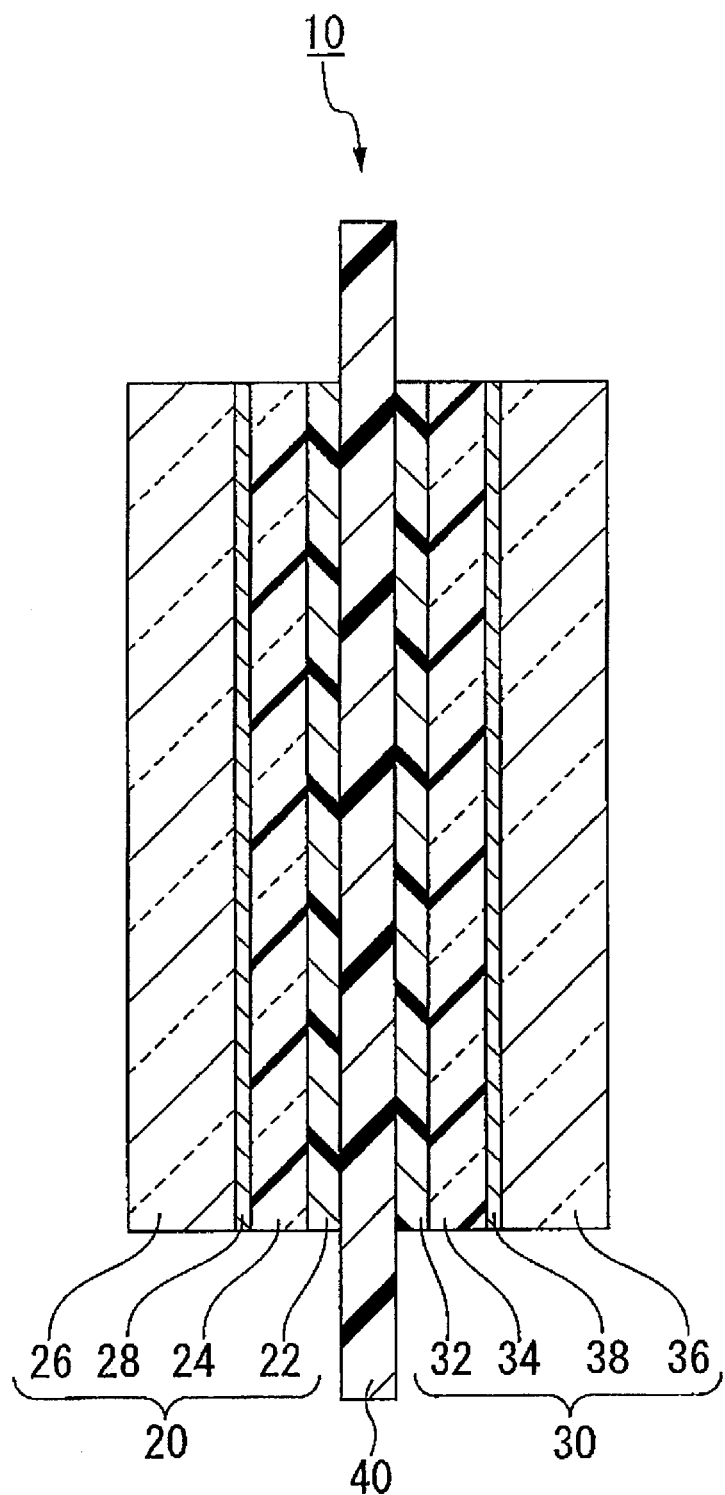
FIG. 2 is a cross-sectional view illustrating another embodiment of the membrane/electrode assembly of the present invention.

The membrane/electrode assembly of the present invention may have an interlayer (not shown) comprising an electrically conductive fiber and a binder and containing no sheet-form reinforcing material, between the catalyst layer and the reinforcing layer. Further, as shown in FIG. 2, it may likewise have an interlayer 28 and an interlayer 38 (hereinafter generally referred to as the interlayer) between the reinforcing layer and the gas diffusion layer.

Although the principle is not necessarily clearly understood, it is considered that by providing an interlayer composed mainly of an electrically conductive fiber, between the catalyst layer and the reinforcing layer, or between the reinforcing layer and the gas diffusion layer, water tends to readily move from the catalyst layer to the reinforcing layer, or from the reinforcing layer to the gas diffusion layer, by a capillary phenomenon, whereby the problem of flooding during the operation of the polymer electrolyte fuel cell tends to be readily solved.

The electrically conductive fiber and the binder may, for example, be the same ones as the electrically conductive fiber and the binder constituting the reinforcing layer.

The thickness of the interlayer is preferably from 1 to 20 μm. Within such a range, the adhesion to the catalyst layer and the reinforcing layer, or the adhesion to the reinforcing layer and the gas diffusion layer, will be good, and the contact resistance at such an interface can be made sufficiently small.

The thickness of the interlayer is measured by observing a cross section of the interlayer by e.g. SEM.

The interlayer may be provided for each of the cathode 20 and the anode 30 or may be provided for one of the cathode 20 and the anode 30. In a case where one of the cathode 20 and the anode 30 has the interlayer, and the other has no interlayer, it is preferred that the cathode 20 has the interlayer.

Polymer Electrolyte Membrane

The polymer electrolyte membrane 40 is a membrane made of an ion exchange resin.

The ion exchange resin is preferably a fluorinated ion exchange resin, from the viewpoint of the durability, more preferably a perfluorocarbon polymer having ionic groups (which may have an etheric oxygen atom), further preferably the polymer (H) or the polymer (Q), particularly preferably the polymer (Q). The membrane of the polymer (Q) has a softening point higher than a conventional ion exchange resin membrane and has high flexibility, whereby the electrical resistance is low, and it has heat resistance higher than the conventional ion exchange resin membrane and is less likely to be broken even when swelling in a wet state and shrinkage in a dry state are repeated.

In order to further improve the durability, the polymer electrolyte membrane 40 may contain at least one type of atoms selected from the group consisting of cerium and manganese. Cerium or manganese will decompose hydrogen peroxide which is a substance to cause deterioration of the polymer electrolyte membrane 40, and cerium or manganese is preferably present in the form of ions in the polymer electrolyte membrane 40, and so long as it is present in the form of ions, it may be present in any state in the polymer electrolyte membrane 40.

The polymer electrolyte membrane 40 may contain silica or a heteropolyacid (such as zirconium phosphate, phosphorus molybdic acid or phosphorus tungstic acid) as a water retention agent to prevent drying.

The thickness of the polymer electrolyte membrane 40 is preferably from 5 to 30 μm, more preferably from 10 to 30 μm, further preferably from 15 to 25 μm. When the thickness of the polymer electrolyte membrane 40 is at most 30 μm, it is possible to more efficiently suppress a deterioration of the power generation performance of the polymer electrolyte fuel cell under a low humidity condition. As the thickness of the polymer electrolyte membrane 40 is thinner, high performance can be developed particularly under a low humidity or non-humidified condition. However, if the thickness is too thin, leakage of gas or electrical short circuiting is likely to result. Accordingly, when the thickness of the polymer electrolyte membrane 40 is adjusted to be at least 5 μm, preferably at least 10 μm, it is possible to suppress leakage of gas or electrical short circuiting, while maintaining high performance under a low humidity or non-humidified condition.

The thickness of the polymer electrolyte membrane 40 is measured by observing a cross section of the polymer electrolyte membrane 40 by e.g. SEM.

EW of the polymer electrolyte membrane 40 is preferably at most 900 g/equivalent, particularly preferably at most 700 g/equivalent. Within such a range, the proton conductivity will be high (the electrical resistance will be low) even under a low humidity environment, whereby a sufficient cell output can be obtained. Also EW of the polymer electrolyte membrane 40 is preferably at least 400 g/equivalent.

This will keep the least strength of the membrane.

EW of the polymer electrolyte membrane 40 is obtained by the following method.

Two types of polymers, of which EW is preliminarily known by titration (one having EW of 1,000 g/equivalent, and one having EW of 909 g/equivalent) are prepared, and with respect to two types of membranes made of the respective polymers (thickness: 200 μm), the peak intensities based on sulfur atoms are measured by means of fluorescent X-ray (RIX3000, manufactured by Rigaku Corporation), whereupon a calibration curve showing the relation between the peak intensities and EW is prepared. The polymer (P) or the polymer (F) is pressed at a temperature of the after-mentioned TQ value to prepare a membrane having a thickness of 200 μm, whereupon the peak intensity based on sulfur atoms is measured by fluorescent X-ray, and EW is obtained by the above calibration curve. Here, the ratio (molar ratio) of —$SO_2F$ groups in the polymer (P) or the polymer (F) is the same as the ratio (molar ratio) of —$SO_3H$ groups in the polymer (Q) or the polymer (H). Accordingly, EW of the polymer (P) or the polymer (F) may be used as it is, as EW of the polymer (Q) or the polymer (H).

Sub-Gaskets

Figure 3:
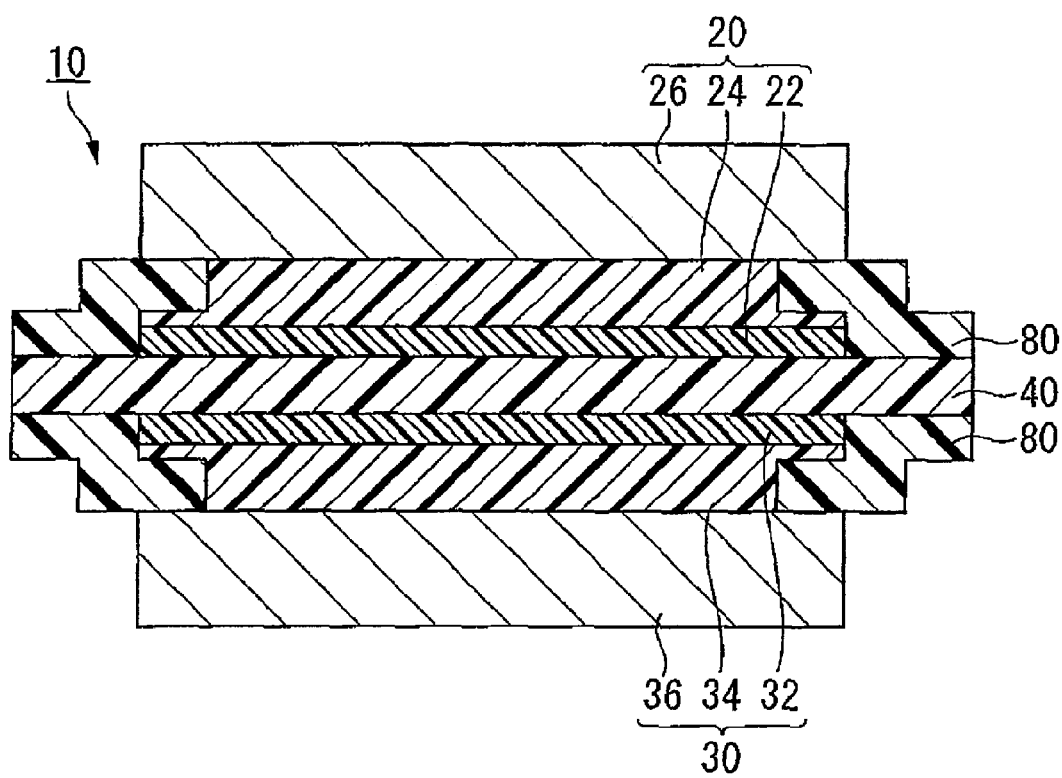
FIG. 3 is a cross-sectional view illustrating still another embodiment of the membrane/electrode assembly of the present invention.

As shown in FIG. 3, the membrane/electrode assembly of the present invention may have two frame-form sub-gaskets 80 disposed to sandwich the polymer electrolyte membrane 40 and the reinforcing layer at the periphery of the membrane/electrode assembly 10. The sub-gasket 80 has an outer edge portion which is in contact with the periphery of the polymer electrolyte membrane 40 and an inner edge portion sandwiched between the periphery of the reinforcing layer and the periphery of the gas diffusion layer.

The sub-gasket 80 has such a size that the outer edge portion can be in contact with the polymer electrolyte membrane 40, and the area of the opening is smaller than the area of the reinforcing layer or the area of the gas diffusion layer. In this case, the area of the polymer electrolyte membrane 40 is larger than the area of the reinforcing layer or the gas diffusion layer.

The material for the sub-gasket 80 may, for example, be a non-fluororesin (such as polyethylene terephthalate, polyethylene naphthalate, polyethylene, polypropylene or polyimide) or a fluororesin (such as PTFE, ETFE, FEP or PFA).

90° Peel Strength

The 90° peel strength at all interfaces present between the polymer electrolyte membrane 40 and the reinforcing layer is preferably at least 0.1 N/cm, more preferably at least 0.3 N/cm, further preferably at least 0.5 N/cm. Such interfaces are the interface between the polymer electrolyte membrane 40 and the catalyst layer, and the interface between the catalyst layer and the reinforcing layer. In a case where an interlayer is present, such interfaces are the interface between the polymer electrolyte membrane 40 and the catalyst layer, the interface between the catalyst layer and the interlayer, and the interface between the interlayer and the reinforcing layer.

When the 90° peel strength is at least 0.1 N/cm, the polymer electrolyte membrane 40, the catalyst layer and the reinforcing layer can be more firmly integrated, whereby a membrane/electrode assembly 10 which is superior in the dimensional stability and mechanical strength can be obtained, and a further stabilized power generation performance can be obtained even when the polymer electrolyte fuel cell is operated in an environment where the polymer electrolyte membrane 40 undergoes repetition of swelling and shrinkage. When the 90° peel strength is at least 0.3 N/cm, a stabilized power generation performance can be obtained for at least few thousands hours, and when it is at least 0.5 N/cm, a stabilized power generation performance can be obtained for a longer period of time.

The 90° peel strength is measured by the following procedures.

Procedure 1: A test specimen of 10 mm in width×80 mm in length comprising reinforcing layer/(interlayer)/catalyst layer/polymer electrolyte membrane/catalyst layer/(interlayer)/reinforcing layer, is prepared.

Figure 4:
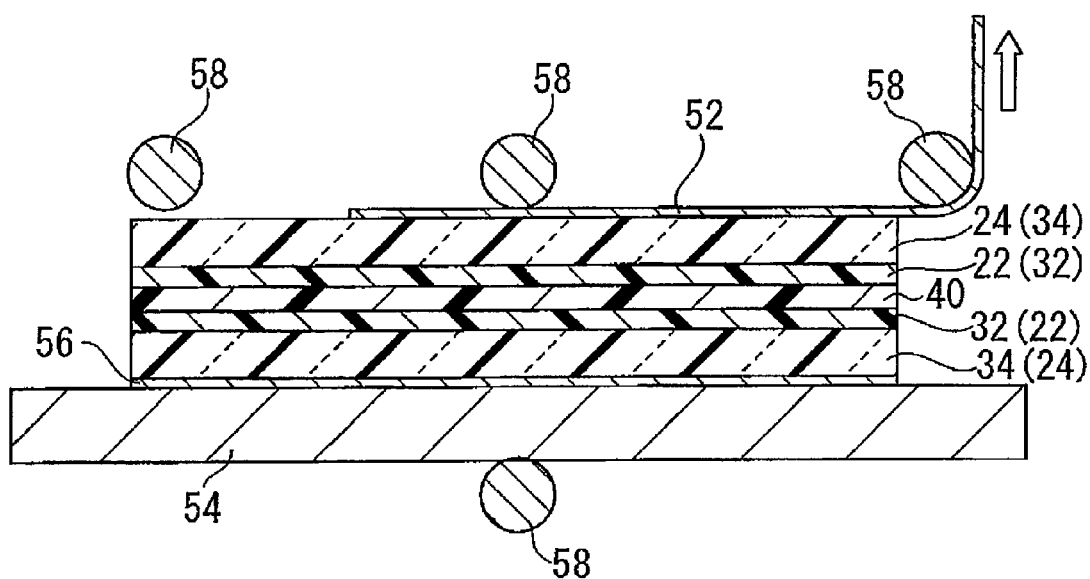
FIG. 4 is a cross-sectional view illustrating a method for measuring the 90° peel strength.

Procedure 2: As shown in FIG. 4, a one side adhesive tape 52 having a length of 120 mm is bonded to the surface of the reinforcing layer 24 (34) for 60 mm in the longitudinal direction from one end of the test specimen. Here, as the one side adhesive tape 52, one having an adhesive strength sufficiently higher than the 90° peel strength at all interfaces present between the polymer electrolyte membrane 40 and the reinforcing layer, is to be employed.

Procedure 3: As shown in FIG. 4, the entire surface of the reinforcing layer 34 (24) on the side not-bonded to the one side adhesive tape 52, is bonded to an aluminum plate 54 of 25 mm in width×150 mm in length×3 mm in thickness by means of a double-sided adhesive tape 56.

Here, as the double-sided adhesive tape 56, one having an adhesive strength sufficiently higher than the 90° peel strength at all interfaces present between the polymer electrolyte membrane 40 and the reinforcing layer, is to be employed.

And, the terminal end of the one side adhesive tape 52 is clamped by a specimen-attaching portion of a tensile tester (not shown) via a stainless steel roller 58 having a diameter of 6 mm.

Procedure 4: The clamped terminal end of the one side adhesive tape 52 was pulled at a rate of 50 mm/min in a direction perpendicular to the test specimen to measure the peel strength at the interface peeled firstly among interfaces present between the polymer electrolyte membrane 40 and the reinforcing layer.

Six test specimens are prepared in accordance with procedure 1, and the 90° peel strength is measured three times on the anode side and three times on the cathode side. For the 90° peel strength, the strength until the interface where peeling started first among interfaces present between the polymer electrolyte membrane 40 and the reinforcing layer, is completely peeled, is measured via the load cell and recorded in a personal computer, and among the measured strengths, an average value is obtained at the portions where the values of the strength are stabilized, i.e. at the portions excluding the values at the initiation and the termination of the measurement of the peel strength, and the average value is taken as the peel strength. An average value of three times of the peel strength is calculated, and the 90° peel strength is obtained by dividing this average value by 10 mm i.e. the width of the test specimen.

Insulation Resistance

The insulation resistance of the membrane/electrode assembly is preferably at least 1,500Ω/cm². If the insulation resistance is less than 1,500Ω/cm$^2$, it is likely that fibers, etc. constituting the gas diffusion layer penetrate into or pierce through the polymer electrolyte membrane 40, whereby the anode and the cathode are electrically short-circuited, and it is likely that the polymer electrolyte membrane 40 will gradually have a large hole due to local heat generation by a current flowing through such a short circuited portion, or due to a local temperature rise due to direct burning of the reaction gas due to leakage of the gas at such a short-circuited portion. When the insulation resistance is at least 1,500Ω/cm$^2$, it is unlikely that such electrical short-circuiting will result, and there will be no possibility that a hole will be formed in the polymer electrolyte membrane 40 due to such short-circuiting.

The insulation resistance of the membrane/electrode assembly 10 is obtained as follows.

The membrane/electrode assembly 10 is assembled into a power generation cell, and while the temperature of the membrane/electrode assembly 10 is maintained at 80° C., hydrogen is supplied at a rate of 50 cc/min to the anode, and nitrogen is supplied at a rate of 200 cc/min to the cathode, each under a pressure of 150 kPa (absolute pressure). The humidity of the gas is adjusted to a relative humidity of 100% for each of hydrogen and air, and the potential of the cathode to the anode was changed from 0.08 V to 0.5 V at a rate of 0.5 mV/min by means of a potentiostat, and the electric current value at that time is recorded together with the electrical potential in a personal computer. From the recorded electrical current value and electrical potential, the inclination of the electrical current value to the electrical potential within a range of the electrical potential being from 0.2 V to 0.5 V, is obtained by a least-square method, whereupon the reciprocal number of such an inclination is taken as the insulation resistance.

Process for Producing Membrane/Electrode Assembly

As a process for producing the membrane/electrode assembly 10, a process having the following steps (I) to (V) may, for example, be mentioned.

(I) A step of forming the polymer electrolyte membrane 40.
(II) A step of forming the reinforcing layer.
(III) A step of forming the catalyst layer on the surface of the reinforcing layer to obtain a first laminate constituted by the reinforcing layer/the catalyst layer.
(IV) A step of bonding the polymer electrolyte membrane 40 and the first laminate to obtain a second laminate constituted by the reinforcing layer/the catalyst layer/the polymer electrolyte membrane/the catalyst layer/the reinforcing layer.
(V) A step of bonding the second laminate and the gas diffusion substrate to obtain the membrane/electrode assembly 10.

Step (I):

The polymer electrolyte membrane 40 is formed, for example, by the following methods.

(I-1) A method wherein the polymer (F) or the polymer (P) is formed into a membrane, followed by the above-mentioned step (iii).

(I-2) A method wherein the polymer (H) or the polymer (Q) obtained by the above step (iii) is formed into a membrane.

Method (I-1):

The method for forming the polymer (F) or the polymer (P) into a membrane may, for example, be an extrusion molding method, a press molding method or a stretching method, since the polymer (F) and the polymer (P) are thereby excellent in the melt flowability.

Method (I-2):

The method for forming the polymer (H) or the polymer (Q) into a membrane may, for example, be a method (a casting method) wherein a liquid composition of the polymer (H) or the polymer (Q) is applied to the surface of a substrate film and dried.

The liquid composition is a dispersion having the polymer (H) or the polymer (Q) dispersed in a dispersion medium containing an organic solvent having a hydroxyl group and water.

The organic solvent having a hydroxyl group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol.

The organic solvent having a hydroxyl group may be used alone, or two or more of such organic solvents may be used as mixed.

The proportion of water is preferably from 10 to 99 mass %, more preferably from 40 to 99 mass %, in the dispersion medium (100 mass %). By increasing the proportion of water, it is possible to improve the dispersibility of the polymer (H) or the polymer (Q) in the dispersion medium.

The proportion of the organic solvent having a hydroxyl group is preferably from 1 to 90 mass %, more preferably from 1 to 60 mass %, in the dispersion medium (100 mass %).

The proportion of the polymer (H) or the polymer (Q) is preferably from 1 to 50 mass %, more preferably from 3 to 30 mass %, in the liquid composition (100 mass %).

The liquid composition may contain a fluorinated solvent. The fluorinated solvent may, for example, be a fluorinated solvent used for the solution polymerization method in the production of the polymer (Q).

It is preferred to carry out thermal treatment in order to stabilize the polymer electrolyte membrane 40. The temperature for the thermal treatment is preferably from 130 to 200° C. When the temperature for the thermal treatment is at least 130° C., the polymer (H) or the polymer (Q) becomes to be not excessively water-absorptive. When the temperature for the thermal treatment is at most 200° C., thermal decomposition of ionic groups can be suppressed, and decrease in the proton conductivity of the polymer electrolyte membrane 40 can be suppressed.

The polymer electrolyte membrane 40 may be treated with an aqueous hydrogen peroxide solution, as the case requires.

Step (II):

A sheet-form reinforcing material is placed on the surface of a substrate film, and then, to the sheet-form reinforcing material, a dispersion containing electrically conductive fiber, and if necessary, a binder (hereinafter referred to as an electrically conductive coating liquid) is applied, permitted to penetrate and dried to form a reinforcing layer.

The electrically conductive coating liquid is prepared by dispersing the electrically conductive fiber in a solvent, and if necessary, dissolving or dispersing a binder in the solvent.

As the solvent, a mixed solvent of water with an alcohol (such as ethanol) is preferred in a case where the binder is an ion exchange resin.

The solid content concentration in the electrically conductive coating liquid is preferably from 5 to 30 mass %.

The substrate film may, for example, be a polypropylene film, a polyethylene terephthalate film or an ETFE film.

As the coating method, a known method may be employed.

The drying temperature is preferably from 40 to 130° C.

Step (III):

To the surface of the reinforcing layer, a coating liquid containing a catalyst and an ion exchange resin (hereinafter referred to as a catalyst layer-forming coating liquid) is applied and dried to form a catalyst layer thereby to obtain a first laminate constituted by the reinforcing layer/the catalyst layer.

The catalyst layer-forming coating liquid is prepared by dispersing a catalyst in a solvent and dissolving or dispersing an ion exchange resin in the solvent.

As the solvent, a mixed solvent of water with an alcohol (such as ethanol) is preferred.

As the coating method, a known method may be employed. The drying temperature is preferably from 40 to 130° C.

Step (IV):

The polymer electrolyte membrane and two first laminates are bonded so that the polymer electrolyte membrane 40 and the catalyst layers are in contact with each other thereby to obtain a second laminate constituted by the reinforcing layer/the catalyst layer/the polymer electrolyte membrane/the catalyst layer/the reinforcing layer.

The bonding method may, for example, be a hot pressing method, a hot roll pressing method or an ultrasonic fusion method, and a hot pressing method is preferred from the viewpoint of the in-plane uniformity.

The temperature of the pressing plate in the pressing machine is preferably from 100 to 150° C.

The pressing pressure is preferably from 0.5 to 4.0 MPa.

Further, the two first laminates may be the same or different so long as they are obtained by the steps (II) and (III).

Step (V):

The substrate film is peeled from the surface of the reinforcing layer, and then two gas diffusion substrates and the second laminate are bonded to obtain a membrane/electrode assembly.

Figure 5:
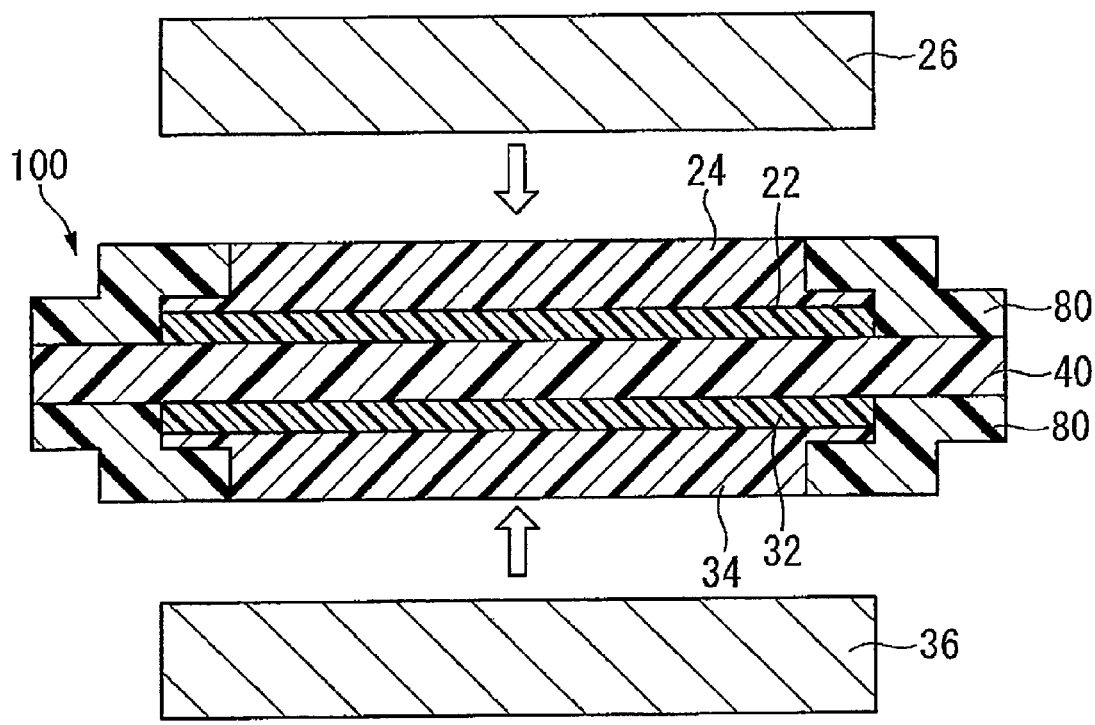
FIG. 5 is a cross-sectional view illustrating a manner of bonding two gas diffusion substrates to a sub-gasket-attached second laminate.

Further, in a case where sub-gaskets 80 are to be disposed, as shown in FIG. 5, two frame-form sub-gaskets 80 are disposed on and beneath the second laminate 100, and then, two gas diffusion substrates (gas diffusion layers 26 and 36) and the sub-gasket 80-provided second laminate 100 are bonded to obtain a membrane/electrode assembly 10 provided with sub-gaskets 80, as shown in FIG. 3.

Here, the sub-gaskets 80 may be formed by applying a liquid sealing material in a frame-form on and beneath of the second laminate 100, followed by curing, or by forming a thermoplastic resin on and beneath the second laminate 100 by hot pressing or injection.

The bonding method may, for example, be a hot pressing method, a hot roll pressing method or an ultrasonic fusion method, and a hot pressing method is preferred from the viewpoint of the in-plane uniformity.

The temperature of the pressing plate in the pressing machine is preferably from 100 to 150° C.

The pressing pressure is preferably from 0.5 to 4.0 MPa.

In the membrane/electrode assembly 10 as described above, the cathode 20 and/or the anode 30 has a reinforcing layer between the catalyst layer and the gas diffusion layer, whereby it has sufficient mechanical strength and dimensional stability. As a result, it has excellent durability even in an environment where moistening, drying, etc. are repeated.

Further, in the membrane/electrode assembly 10 as described above, no reinforcing material is present in the polymer electrolyte membrane 40, whereby there will be no possibility that the ion conductivity of the polymer electrolyte membrane 40 is impaired. As a result, a high power generation performance can be obtained even under a low humidity condition.

Further, the membrane/electrode assembly 10 is capable of exhibiting the following effects as it has the reinforcing layer.

(i) The inner edge portion of the sub-gasket 80 for protection of the polymer electrolyte membrane 40 is disposed along the periphery of the reinforcing layer, whereby at the time of hot bonding, it is possible to prevent penetration of the inner edge portion of the sub-gasket 80 into the polymer electrolyte membrane 40, as the reinforcing layer serves as the buffer material. It is thereby possible to suppress local thinning of the polymer electrolyte membrane 40 thereby to improve the mechanical strength.

(ii) In the case of hot bonding of the gas diffusion layer, it is possible to prevent by the reinforcing layer a physical damage such as piercing of fibers, etc. constituting the gas diffusion layer into the polymer electrolyte membrane 40. It is thereby possible to prevent short-circuiting of the membrane/electrode assembly 10. Namely, durability will be excellent.

(iii) The inner edge portion of the sub-gasket 80 is embedded in the periphery of the reinforcing layer, whereby a difference in level due to the sub-gasket 80 is less likely to result on both surfaces of the second laminate 100. It is thereby possible to satisfactorily carry out the bonding of the gas diffusion layer.

Further, with the membrane/electrode assembly 10 provided with the sub-gaskets 80, by disposing the polymer electrolyte membrane 40 and the sub-gaskets 80 so that they are partially in contact, it is possible to prevent leakage of a gas such as hydrogen gas.

Polymer Electrolyte Fuel Cell

The membrane/electrode assembly of the present invention is used for a polymer electrolyte fuel cell. The polymer electrolyte fuel cell is, for example, one wherein cells each comprising the membrane/electrode assembly and a pair of separators disposed so that the membrane/electrode assembly is interposed between them, are stacked so that the membrane/electrode assemblies and the separators are alternately disposed.

A separator is one having a plurality of grooves formed to constitute gas flow paths on each side.

The separators may be separators made of various electrically conductive materials, such as separators made of metal, separators made of carbon, or separators made of a mixed material of graphite and a resin.

Types of the polymer electrolyte fuel cell may, for example, be a hydrogen/oxygen type fuel cell, a direct methanol type fuel cell (DMFC).

The polymer electrolyte fuel cell of the present invention is characterized in that power generation is carried out by feeding a reaction gas (fuel gas and oxidant gas) having a relative humidity of at most 25% to the membrane/electrode assembly of the present invention. Specifically, an oxidant gas (such as air) having a relative humidity of at most 25% is supplied to the cathode 20 side, and a fuel gas (such as hydrogen gas) having a relative humidity of at most 25% is supplied to the anode 30 side.

With the polymer electrolyte fuel cell of the present invention as described above, since the membrane/electrode assembly of the present invention is used, it is possible to provide a high power generation performance even under a low humidity condition (i.e. the relative humidity is at most 25%).

EXAMPLES

Now, the present invention will be described in further detail with reference to Examples. However, it should be understood that the present invention is by no means thereby restricted.

Examples 1 to 5, 9 to 16 and 18 to 21 are Examples of the present invention, and Examples 6 to 8 and 17 are Comparative Examples.

EW

EW of the polymer (P) was obtained by the following method.

Two types of polymers, of which EW is preliminarily known by titration (one having EW of 1,000 g/equivalent, and one having EW of 909 g/equivalent) were prepared, and with respect to two types of membranes made of the respective polymers (thickness: 200 μm), the peak intensities based on sulfur atoms were measured by means of fluorescent X-ray (RIX3000, manufactured by Rigaku Corporation), whereupon a calibration curve showing the relation between the peak intensity and EW was prepared. The polymer (P) was pressed at a temperature of the after-mentioned TQ value to prepare a membrane having a thickness of 200 μm, and the peak intensity based on sulfur atoms was measured by fluorescent X-ray, whereupon EW was obtained by the above calibration curve. Here, the ratio (molar ratio) of $-SO_2F$ groups in the polymer (P) is the same as the ratio (molar ratio) of $-SO_3H$ groups in the polymer (Q), and EW of the polymer (P) can be used as it is, as EW of the polymer (Q).

EW of the polymer (Q2) or the polymer (H2) was obtained by the following method.

A film of the polymer was vacuum-dried at 110° C. for 16 hours to obtain about 2 g of the dried film. This film was immersed in 30 mL of a 0.1N sodium hydroxide solution to substitute protons in the film by sodium ions. Then, titration by neutralization was carried out by 0.1N hydrochloric acid, and EW was calculated from sodium hydroxide consumed by such ion exchange to the film.

Molar Ratios of Repeating Units

The molar ratios of repeating units constituting the polymer (P) were obtained by melt $^{19}$F-NMR.

TQ Value

The TQ value (unit: ° C.) is an index for the molecular weight of a polymer and is a temperature at which the amount of a polymer extruded becomes 100 mm$^3$/sec when melt extrusion is carried out under an extrusion pressure of 2.94 MPa by using a nozzle with a length of 1 mm and an inner diameter of 1 mm.

The amount of the polymer (P) extruded was measured by changing the temperature by means of a flow tester CFT-500A (manufactured by Shimadzu Corporation), and the TQ value at which the amount extruded became 100 mm$^3$/sec was determined.

Proton Conductivity

The proton conductivity of the film of the polymer (Q) was determined by the following method.

To a film of the polymer (Q) with a width of 5 mm, a substrate having four-terminal electrodes disposed thereon with a distance of 5 mm was closely contacted, and the resistance of the film was measured at an alternating current of 10 kHz at a voltage of 1 V under constant temperature and humidity conditions at a temperature of 80° C. with a relative humidity of 50% by a known four-probe method, and the proton conductivity was calculated from the results. The proton conductivity is an index for the electrical resistance of the polymer electrolyte membrane.

Softening Temperature, Glass Transition Temperature

The softening temperature and the glass transition temperature of the polymer (Q) were determined by the following method.

Using a dynamic viscoelasticity-measuring device (DVA200, manufactured by ITK Co., Ltd.), the dynamic viscoelasticity measurement of the film of the polymer (Q) was carried out under such conditions that the sample width was 0.5 cm, the gripping distance was 2 cm, the measuring frequency was 1 Hz and the temperature raising rate was 2° C./min, whereby the value at which the storage elasticity became a half of the value at 50° C., was taken as a softening temperature. Further, from the peak value of tan δ, the glass transition temperature (Tg) was obtained.

90° Peel Strength

The 90° peel strength was measured by the following procedures.

Procedure 1: From the second laminate, a test specimen of 10 mm in width×80 mm in length was cut out.

Procedure 2: As shown in FIG. 4, a one side adhesive tape 52 having a length of 120 mm (only one side adhesive layer of double sided adhesive tape No. 5015, manufactured by Nitto Denko Corporation, was used) was bonded to the surface of the reinforcing layer 24 (34) for 60 mm in the longitudinal direction from the terminal end of the test specimen.

Procedure 3: As shown in FIG. 4, the entire surface of the reinforcing layer 34 (24) on the side not bonded to the one side adhesive tape 52, was bonded to an aluminum plate 54 of 25 mm in width×150 mm in length×3 mm in thickness by means of a double sided adhesive tape 56.

And, the terminal end of the one side adhesive tape 52 was held by the sample-attaching portion of a tensile tester (universal tester (Tensilon), RTE-1210, manufactured by ORIENTEC Co., LTD) via a stainless steel roller 58 having a diameter of 6 mm.

Procedure 4: The terminal end of the one side adhesive tape 52 thus held, was pulled at a rate of 50 mm/min in a direction perpendicular to the test specimen, whereby the peel strength at the interface where peeling occurred first among interfaces present between the polymer electrolyte membrane 40 and the reinforcing layer, was measured.

Six test specimens were prepared in accordance with procedure 1, and the 90° peel strength was measured three times on the anode side and three times on the cathode side.

For the 90° peel strength, the strength until the interface at which peeling started first among interfaces present between the polymer electrolyte membrane 40 and the reinforcing layer, was completely peeled, was measured via a load cell and recorded on a personal computer, and an average value was obtained with respect to the portions where the values of the strength are stabilized, i.e. the portions excluding the values at the initiation and termination of the measurements of the peel strength, among the measured strengths, and such an average value was taken as the peel strength. An average value of two measured values where the peel strength was stabilized, was calculated and the 90° peel strength was obtained by dividing this average value by 10 mm i.e. the width of the test specimen.

Dimensional Change

The dimensional change of the second laminate or the membrane/catalyst layer assembly, was measured by the following procedures.

Procedure 1: The second laminate was placed in an atmosphere at a temperature of 25° C. under a relative humidity of 50% for at least 16 hours, and then, at the center portion of the sample, horizontal and vertical lengths were measured, and their average sizes (a) were calculated.

Procedure 2: The second laminate was immersed in warm water of 80° C. for 3 hours.

Procedure 3: The second laminate was cooled to room temperature in the state where it was immersed in the warm water and then taken out from the water, whereupon at the center portion of the sample, the horizontal and vertical lengths were measured, and their average sizes (b) were calculated.

Procedure 4: The dimensional change was calculated from the following formula.

Dimensional change (%)=[size (b)−size (a)]/size (a)× 100

Cell Voltage

The membrane/electrode assembly was assembled into a power generation cell; while the membrane/electrode assembly was maintained at a temperature shown in Table, hydrogen (utilization ratio: 70%) was supplied to the anode, and air (utilization ratio: 50%) was supplied to the cathode, under the respective pressures (absolute pressures) shown in Table. The humidity of the gas was adjusted to the relative humidity shown in Table for each of hydrogen and air, and the cell voltage at the time of the current density shown in Table was recorded.

Resistance

The membrane/electrode assembly was assembled into a power generation cell, and under the same conditions as in the measurement of the cell voltage, the resistance was measured by a current interruption method.

Insulation Resistance

The membrane/electrode assembly was assembled into a power generation cell; and while the temperature of the membrane/electrode assembly was maintained at 80° C., hydrogen was supplied at a rate of 50 cc/min to the anode, and nitrogen was supplied at a rate of 200 cc/min to the cathode, under a pressure of 150 kPa (absolute pressure), respectively. The humidity of the gas was adjusted to a relative humidity of 100% for each of hydrogen and air, and the electrical potential of the cathode to the anode was changed from 0.08 V to 0.5 V at a rate of 0.5 mV/min by means of a potentiostat (1287, manufactured by Solartron), whereby the electrical current value at that time was recorded together with the electrical potential in a personal computer. From the recorded electrical current value and electrical potential, the inclination of the electrical current value to the potential was obtained by a least-square method within an electrical potential range of from 0.2 V to 0.5 V, and the reciprocal number of such inclination was taken as the insulation resistance.

Moistening-Drying Cycle Test

The moistening-drying cycle test was carried out in accordance with the method disclosed in the following literature: Yeh-Hung Lai, Cortney K. Mittelsteadt, Craig S. Gittleman, David A. Dillard, "VISCOELASTIC STRESS MODEL AND MECHANICAL CHARACTERIZATION OF PER-FLUOROSULFONIC ACID (PFSA) POLYMER ELECTROLYTE MEMBRANES", Proceedings of FUELCELL2005, Third International Conference on Fuel Cell Science, Engineering and Technology, FUELCELL2005, (2005), 74120.

Specifically, the test was carried out as follows.

The membrane/electrode assembly was assembled into a power generation cell (electrode area: 25 cm²), and at a cell temperature of 80° C., nitrogen was supplied to the anode and the cathode, respectively, at a rate of 1 L/min. At that time, the gas was supplied for two minutes by adjusting the humidity of the gas to a relative humidity of 150% for each of the anode and the cathode, and then the gas was supplied for two minutes by adjusting the humidity to a relative humidity of 0%, and this process was taken as one cycle and repeated. Every 100 cycles, a pressure difference was created between the anode and the cathode, whereby the presence or absence of physical gas leakage was judged. The time when the gas leakage occurred, and the gas crossover rate became at least 10 sccm, was judged to be the lifetime. The number of cycles at such a time is used as an index for the durability performance. A case where the number of cycles was less than 20,000 cycles, was identified by X, and a case where the number was more than 20,000 cycles was identified by ○.

Preparation Example

By the following synthesis route, the compound (m12) was prepared.

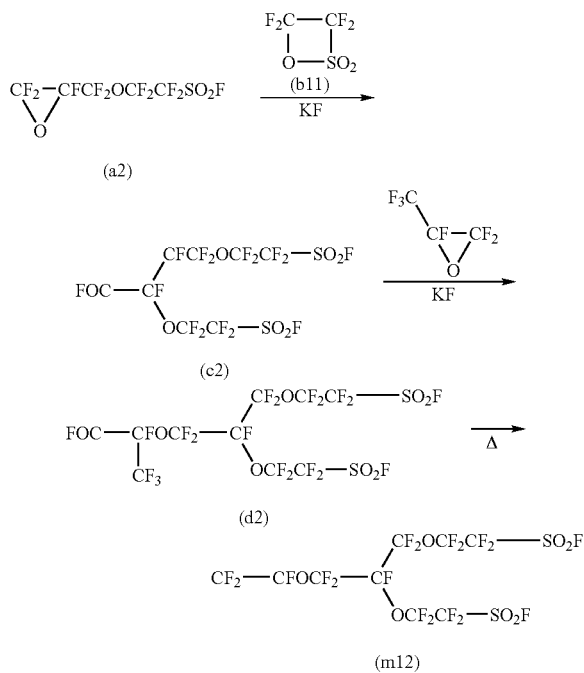

Preparation of Compound (a2)

The compound (a2) was prepared in the same manner as the method disclosed in Example 2 in JP-A-57-176973.

Preparation of Compound (c2)

Into a 300 cm³ four-necked round-bottomed flask equipped with a Dimroth condenser, a thermometer, a dropping funnel and a glass rod with stirring vanes, 1.6 g of potassium fluoride (CHLOROCATCH F, manufactured by Morita Chemical Industries Co., Ltd.) and 15.9 g of dimethoxyethane were charged in a nitrogen atmosphere. Then, the round-bottomed flask was cooled in an ice bath, and 49.1 g of the compound (b11) was dropwise added from the dropping funnel over a period of 32 minutes at an internal temperature of at most 10° C. After completion of the dropwise addition, 82.0 g of the compound (a2) was dropwise added over a period of 15 minutes from the dropping funnel. No substantial increase in the internal temperature was observed. After completion of the dropwise addition, the internal temperature was returned to room temperature, and stirring was continued for about 90 hours. The lower layer was recovered by a separation funnel. The recovered amount was 127.6 g, and the purity by gas chromatography (hereinafter referred to as GC) was 55%. The recovered liquid was transferred to a 200 cm³ four-necked round-bottomed flask, and distillation was carried out. As a fraction of a reduced pressure of from 1.0 to 1.1 kPa (absolute pressure), 97.7 g of the compound (c2) was obtained. The GC purity was 98%, and the yield was 80%.

Preparation of Compound (d2)

Into a 200 cm³ stainless steel autoclave, 1.1 g of potassium fluoride (CHLOROCATCH F, manufactured by Morita Chemical Industries Co., Ltd.) was charged. After deaeration, 5.3 g of dimethoxyethane, 5.3 g of acetonitrile and 95.8 g of the compound (c2) were charged to the autoclave under reduced pressure.

Then, the autoclave was cooled in an ice bath, and at an internal temperature of from 0 to 5° C., 27.2 g of hexafluoropropeneoxide was added over a period of 27 minutes, and then, the internal temperature was returned to room temperature with stirring, and stirring was continued overnight. By a separating funnel, the lower layer was recovered. The recovered amount was 121.9 g, and the GC purity was 63%. The recovered liquid was distilled, and 72.0 g of the compound (d2) was obtained as a fraction having a boiling point of from 80 to 84° C./0.67 to 0.80 kPa (absolute pressure). The GC purity was 98%, and the yield was 56%.

Preparation of Compound (m12)

Using a stainless steel tube having an inner diameter of 1.6 cm, a U-tube having a length of 40 cm was prepared. In one side of the U-tube, glass wool was packed, and in the other side, glass beads were packed by using a stainless steel sintered metal grating, thereby to obtain a fluidized bed reactor. Using nitrogen gas as a fluidization gas, the starting material was made to be continuously supplied by using a metering pump. The outlet gas was collected by liquid nitrogen by means of a trapping tube.

The fluidized bed reactor was put in a salt bath, and while the reaction temperature was maintained to be 340° C., 34.6 g of the compound (d2) was supplied to the fluidized bed reactor over a period of 1.5 hours so that the molar ratio of the compound (d2)/$N_2$ would be 1/20. After completion of the reaction, 27 g of a liquid was obtained from the liquid nitrogen trap. The GC purity was 84%, the liquid was distilled to obtain the compound (m12) as a fraction of a boiling point of 69° C./0.40 kPa (absolute pressure). The GC purity was 98%.

$^{19}$F-NMR of compound (m12) (282.7 MHz, solvent CDCl$_3$, standard: CFCl$_3$).

δ (ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Example 1

Step (I)

Preparation of Polymer (P1)

An autoclave (internal capacity: 2,575 cm³, made of stainless steel) was flushed with nitrogen and sufficiently deaerated. Under reduced pressure, 950.3 g of the compound (m12), 291.4 g of the compound (m21), 490.1 g of the compound (3-1) as a solvent, 173.7 mg of methanol and 873.1 mg of the compound (4) (Peroyl IPP, manufactured by NOF Corporation) as a radical initiator, were charged, and inside of the autoclave was deaerated to vapor pressure.

CClF$_2$CF$_2$CHClF (3-1)

(CH$_3$)$_2$CHOC(=O)OOC(=O)OCH(CH$_3$)$_2$ (4)

The internal temperature was raised to 40° C., and TFE was introduced into the autoclave to adjust the pressure to 0.44 MPaG (gauge pressure). While the temperature and the pressure were maintained to be constant, polymerization was carried out for 6.0 hours. Then, inside of the autoclave was cooled to terminate the polymerization, and the gas in the system was purged.

The reaction liquid was diluted with the compound (3-1), and then, the compound (3-2) was added to agglomerate the polymer, followed by filtration.

CH$_3$CCl$_2$F (3-2)

The polymer was stirred in the compound (3-1), and then the compound (3-2) was added to reagglomerate the polymer, followed by filtration. Such reagglomeration was repeated twice. The polymer was dried under reduced pressure overnight at 80° C. to obtain 203.4 g of a polymer (P1) which is a copolymer of TFE, the compound (m12) and the compound (m21). The EW, the ratio of repeating units constituting the polymer and the TQ value are shown in Table 1.

TABLE 1

|  | Ex. 1 |
|---|---|
| Obtained precursor polymer | P1 |
| EW [g/equivalent] | 645 |
| Units (TFE) [mol %] | 84.0 |
| Units (M12) [mol %] | 11.2 |
| Units (M21) [mol %] | 4.8 |
| U2/(U1 + U2) [molar ratio] | 0.3 |
| TQ [° C.] | 269 |

Production of Film of Polymer (Q1)

The polymer (P1) was treated by the following method to obtain a film of an acid form polymer (Q1).

Firstly, the polymer (P1) was added to an aqueous potassium hydroxide solution containing methanol under heating to hydrolyze —SO$_2$F groups to convert them to —SO$_3$K groups.

Then, the polymer was washed with water and added to an aqueous sulfuric acid solution to obtain an acid form polymer (Q1) wherein the —SO$_3$K groups were converted to sulfonic acid groups.

The polymer (Q1) was dispersed in a mixed dispersion medium of methanol/water=1/1 (mass ratio) to obtain a polymer (Q1) dispersion having a solid content concentration of 13 mass %.

The polymer (Q1) dispersion was applied on the surface of an ETFE film (AFLEX 100N, manufactured by Asahi Glass Company, Limited, thickness: 100 μm) by a die coater and dried for 15 minutes in a dryer at 80° C. and further subjected to thermal treatment for one hour in a dryer at 160° C. to obtain a film of the polymer (Q1) (the polymer electrolyte membrane, thickness: 20 μm).

The softening temperature, the glass transition temperature and the proton conductivity of the film of the polymer (Q1) were measured. The results are shown in Table 2.

TABLE 2

|  | Ex. 1 |
|---|---|
| Precursor polymer used | P1 |
| Obtained acid form polymer | Q1 |

TABLE 2-continued

|  | Ex. 1 |
| --- | --- |
| Softening point [° C.] | 97 |
| Tg (tanδ) [° C.] | 127 |
| Proton conductivity [S/cm] | 0.12 |

Step (II)

A polymer (H1) (ion exchange capacity: 1.1 meq/g dry resin) comprising units based on TFE and units (11), was dispersed in ethanol to prepare an ion exchange resin liquid (A) having a solid content concentration of 10 mass %.

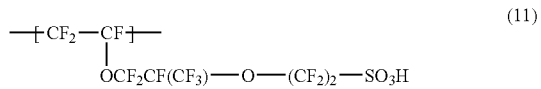

(11)

10.0 g of vapor phase-grown carbon fiber (VGCF-H, manufactured by Showa Denko K.K., fiber diameter: about 150 nm, fiber length: 10 to 20 μm) was added to 45.5 g of distilled water and 22.5 g of ethanol, followed by thorough stirring. 30 g of the ion exchange resin liquid (A) was added thereto, followed by thorough stirring and further by mixing and pulverization by means of an ultrasonic application device to obtain an electrically conductive coating liquid (a). The mass ratio of the vapor phase-grown carbon fiber to the polymer (H1) in the electrically conductive coating liquid (a) (vapor phase-grown carbon fiber/polymer (H1)) was 1/0.3.

As a sheet-form reinforcing material, polypropylene non-woven fabric (unit weight: 5 g/m², average fiber diameter: 2 μm, thickness: 40 μm) was prepared.

The polypropylene non-woven fabric was placed on the surface of the ETFE film (AFLEX 100N, manufactured by Asahi Glass Company, Limited, thickness: 100 μm), and a 50 mass % ethanol aqueous solution was impregnated to the non-woven fabric to bring it in close contact with the ETFE film, followed by drying for 15 minutes in a dryer at 80° C. to fix it on the surface of the ETFE film.

On the surface of the polypropylene non-woven fabric, the electrically conductive coating liquid (a) was applied by means of a bar coater, followed by drying for 15 minutes in a dryer at 80° C. to form a reinforcing layer. The thickness of the reinforcing layer was about 70 μm. Further, on both sides of the reinforcing layer, interlayers in a total thickness of about 30 μm were simultaneously formed.

Step (III)

The polymer (P1) obtained in step (I) was added to an aqueous potassium hydroxide solution containing methanol under heating to hydrolyze —SO₂F groups to convert them to —SO₃K groups.

The polymer was washed with water and added to an aqueous sulfuric acid solution to obtain an acid-form polymer (Q1) wherein the —SO₃K groups were converted to sulfonic acid groups.

The polymer (Q1) was dispersed in ethanol and water to obtain a polymer (Q1) dispersion having a solid content concentration of 13 mass %.

10 g of a catalyst (manufactured by Tanaka Kikinzoku Kogyo K.K.) having 50% of platinum supported on a carbon carrier (specific surface area: 800 m²/g), was added to 72.5 g of distilled water, followed by thorough stirring, and further, 40.5 g of ethanol was added, followed by pulverization and thorough mixing by means of an ultrasonic application device. 40 g of the polymer (Q1) dispersion was added thereto, followed by thorough stirring to obtain a coating liquid (b) for a catalyst layer.

On the surface of the reinforcing layer formed in Step (II), the coating liquid (b) for a catalyst layer was applied by means of a die coater so that the amount of platinum would be 0.5 mg/cm², then dried for 15 minutes in a dryer at 80° C. and further subjected to thermal treatment for 30 minutes in a dryer at 140° C. to obtain a first laminate (B1).

Step (IV)

As a polymer electrolyte membrane, the film of the polymer (Q1) having a thickness of 20 μm obtained in step (I) was prepared.

The film of the polymer (Q1) and two sheets of the first laminate (B1) were overlaid so that the film of the polymer (Q1) was in contact with the catalyst layers, and they were put in a pressing machine preliminarily heated to 130° C. and hot-pressed for 3 minutes under a pressing pressure of 3 MPa.

Immediately after being taken out from the pressing machine, the ETFE films were removed to obtain a second laminate (C1) having an electrode area of 25 cm².

With respect to the second laminate (C1), the 90° peel strength and the dimensional change were measured. The results are shown in Table 3.

Step (V)

Carbon paper with water repellent treatment (H2315T10A, manufactured by NOK) was disposed on each side of the second laminate (C1) to obtain a membrane/electrode assembly (D1).

With respect to the membrane/electrode assembly (D1), the cell voltage and the resistance were measured. Further, the moistening-drying cycle test was carried out. The results are shown in Table 3.

Example 2

A second laminate (C2) and a membrane/electrode assembly (D2) were obtained in the same manner as in Example 1 except that the unit weight of the polypropylene non-woven fabric as a sheet-form reinforcing material was changed to 3 g/m². The thickness of the reinforcing layer was about 50 μm.

With respect to the second laminate (C2), the 90° peel strength and the dimensional change were measured. The results are shown in Table 3.

With respect to the membrane/electrode assembly (D2), the cell voltage and the resistance were measured, and the moistening-drying cycle test was carried out. The results are shown in Table 3.

Example 3

Step (II)

As a sheet-form reinforcing material, a stretched porous PTFE film (Tetratex II 3108, manufactured by Donaldson, thickness: 20 μm, average pore diameter: 3 μm) was prepared.

On the surface of an ETFE film (AFLEX 100N, manufactured by Asahi Glass Company, Limited, thickness: 100 μm), the stretched porous PTFE film was placed, and ethanol was impregnated to the film to bring it in close contact with the ETFE film, followed by drying for 15 minutes in a dryer at 80° C. to fix it on the surface of the ETFE film.

On the surface of the stretched porous PTFE film, the electrically conductive coating liquid (a) was applied by means of a bar coater, followed by drying for 15 minutes in a dryer at 80° C. to form a reinforcing layer. The thickness of the reinforcing layer was about 50 μm.

Steps (III) to (V)

Steps (III) to (V) were carried out in the same manner as in Example 1 except that the reinforcing layer was changed, to obtain a second laminate (C3) and a membrane/electrode assembly (D3).

With respect to the second laminate (C3), the 90° peel strength and the dimensional change were measured. The results are shown in Table 3.

With respect to the membrane/electrode assembly (D3), the cell voltage and the resistance were measured, and the moistening-drying cycle test was carried out. The results are shown in Table 3.

Example 4

Step (V)

On the surface of carbon paper with water repellent treatment (H2315T10A, manufactured by NOK), the electrically conductive coating liquid (a) was applied by means of a bar coater, then dried for 15 minutes in a dryer at 80° C. and further subjected to thermal treatment for 30 minutes in a dryer at 120° C., to form an interlayer. The thickness of the interlayer was about 5 μm.

The carbon paper provided with the interlayer was disposed on each side of the second laminate (C1) obtained in step (IV) in Example 1, to obtain a membrane/electrode assembly (D4).

With respect to the membrane/electrode assembly (D4), the cell voltage and the resistance were measured, and further, the moistening-drying cycle test was carried out. The results are shown in Table 3.

Example 5

Step (II)

Using a melt-blown non-woven fabric-producing apparatus (manufactured by Nippon Nozzle Co., Ltd.), ETFE was blown from a die under conditions of the die temperature being 290° C., and the hot air temperature for stretching being 320° C., to form ETFE non-woven fabric on a conveyer having suction ability.

ETFE constituting the ETFE non-woven fabric was a continuous fiber, and its aspect ratio was at least 10,000. The unit weight of the ETFE non-woven fabric was 10 g/m$^2$, the average fiber diameter was 5 μm, and the thickness was 60 μm.

A reinforcing layer was formed in the same manner as in Example 3 except that the stretched porous PTFE film was changed to the ETFE non-woven fabric. The thickness of the reinforcing layer was about 90 μm. Further, on both sides of the reinforcing layer, interlayers in a total amount of about 30 μm were simultaneously formed.

Steps (III) to (IV)

Steps (III) to (IV) were carried out in the same manner as in Example 1 except that the reinforcing layer was changed, to obtain a second laminate (C5).

With respect to the second laminate (C5), the 90° peel strength and the dimensional change were measured. The results are shown in Table 3.

Step (V)

A membrane/electrode assembly (D5) was obtained in the same manner as in Example 4 except that the second laminate (C5) was used.

With respect to the membrane/electrode assembly (D5), the cell voltage and the resistance were measured, and the moistening-drying cycle test was carried out. The results are shown in Table 3.

Example 6

On the surface of an ETFE film (AFLEX 100N, manufactured by Asahi Glass Company, Limited, thickness: 100 μm), the coating liquid (b) for a catalyst layer was applied by means of a die coater so that the amount of platinum would be 0.5 mg/cm$^2$, followed by drying for 15 minutes in a dryer at 80° C. to form a catalyst layer.

As a polymer electrolyte membrane, the film of the polymer (Q1) having a thickness of 20 μm obtained in step (I) in Example 1 was prepared.

The film of the polymer (Q1) and two ETFE films each provided with the catalyst layer were overlaid so that the film of the polymer (Q1) was in contact with the catalyst layers, and they were put in a pressing machine preliminarily heated to 130° C. and hot-pressed for 3 minutes under a pressing pressure of 3 MPa.

Immediately after being taken out from the pressing machine, the ETFE films were removed to obtain a membrane/catalyst layer assembly having an electrode area of 25 cm$^2$.

With respect to the membrane/catalyst layer assembly, the dimensional change was measured. The results are shown in Table 3.

Carbon paper with water repellent treatment (H2315T10A, manufactured by NOK) was disposed on each side of the membrane/catalyst layer assembly to obtain a membrane/electrode assembly (D6).

With respect to the membrane/electrode assembly (D6), the cell voltage and the resistance were measured. Further, the moistening-drying cycle test were carried out. The results are shown in Table 3.

Example 7

The polymer (Q1) is dispersed in a mixed dispersion medium of ethanol and water to prepare a polymer (Q1) dispersion having a solid content concentration of 13 mass %.

The same polypropylene non-woven fabric (unit weight: 3 g/m$^2$) as used in Example 2 is dispersed in a polymer (Q1) dispersion in such a state that the edge is restricted and withdrawn at a rate of 100 mm/min to impregnate the polymer (Q1) into the non-woven fabric. This immersion-withdrawing operation is repeated three times, followed by drying at 55° C. for one hour in a restricted state and further subjected to thermal treatment for 30 minutes in a dryer at 140° C. and they were put in a pressing machine preliminarily heated to 150° C. and hot-pressed for 3 minutes under a pressing pressure of 3 MPa to obtain a polymer electrolyte membrane internally reinforced by the polypropylene non-woven fabric having a thickness of about 25 μm.

A membrane/catalyst layer assembly and a membrane/electrode assembly (D7) are obtained in the same manner as in Example 6 except that this polymer electrolyte membrane is employed.

With respect to the membrane/electrode assembly, the dimensional change is measured. The results are shown in Table 3.

With respect to the membrane/electrode assembly (D7), the cell voltage and the resistance are measured. Further, the moistening-drying cycle test is carried out. The results are shown in Table 3.

Example 8

On the surface of an ETFE film (AFLEX 100N, manufactured by Asahi Glass Company, Limited, thickness: 100 μm), only the electrically conductive coating liquid (a) was applied and dried for 15 minutes in a dryer at 80° C. to form a layer. The thickness of this layer was about 30 μm. Further, on the surface of this layer, the coating liquid (b) for a catalyst layer was applied by means of a die coater so that the amount of platinum would be 0.5 mg/cm$^2$ and dried for 15 minutes in a dryer at 80° C. to form a catalyst layer.

As a polymer electrolyte membrane, the film of the polymer (Q1) having a thickness of 20 μm obtained in step (I) in Example 1 was prepared.

The film of the polymer (Q1) and two ETFE films each provided with the catalyst layer were overlaid so that the film of the polymer (Q1) was in contact with the catalyst layers, and they were put in a pressing machine preliminarily heated to 130° C. and hot-pressed for 3 minutes under a pressing pressure of 3 MPa.

Immediately after being taken out from the pressing machine, the ETFE films were removed to obtain a membrane/catalyst layer assembly having an electrode area of 25 cm$^2$.

With respect to the membrane/catalyst layer assembly, the dimensional change was measured. The results are shown in Table 3.

Further, carbon paper with water repellent treatment (H2315T10A, manufactured by NOK) was disposed on each side of the membrane/catalyst layer assembly to obtain a membrane/electrode assembly (D8).

With respect to the membrane/electrode assembly (D8), the cell voltage and the resistance were measured. Further, the moistening-drying cycle test were carried out. The results are shown in Table 3.

Example 9

Step (I)

Production of Film of Polymer (Q2)

The polymer (Q1) was dispersed in a mixed dispersion medium of water and ethanol to obtain a polymer (Q1) dispersion having a solid content concentration of 10 mass %.

To the polymer (Q1) dispersion, a solution having cerium nitrate dissolved in distilled water, was added to obtain a polymer (Q2) dispersion wherein about 10% of sulfonic acid groups in the polymer (Q1) were ion-exchanged by $Ce^{3+}$.

The polymer (Q2) dispersion was applied on the surface of an ETFE film (AFLEX 100N, manufactured by Asahi Glass Company, Limited, thickness: 100 μm) by a die coater and dried for 15 minutes in a dryer at 80° C. and further subjected to thermal treatment for one hour in a dryer at 160° C. to obtain a film of the polymer (Q2) (the polymer electrolyte membrane, thickness: 20 μm).

The EW and the proton conductivity of the film of the polymer (Q2) were measured. The results are shown in Table 4.

TABLE 4

|  | Ex. 9 |
|---|---|
| Acid form polymer used | Q1 |
| Obtained polymer | Q2 |
| EW [g/equivalent] | 700 |
| Proton conductivity [S/cm] | 0.08 |

Step (II) to Step (IV)

A second laminate (C9) was obtained in the same manner as in Example 1 except that the film of the polymer (Q1) as a polymer electrolyte membrane was changed to the film of the polymer (Q2). The thickness of the reinforcing layer was about 70 μm.

With respect to the second laminate (C9), the dimensional change was measured. The results are shown in Table 6.

Step (V)

A sub-gasket was disposed on each side of the second laminate (C9), and the assembly was put in a pressing

TABLE 3

| | | | Current density 1.0 A/cm$^2$ | | | | |
| | | | Cell voltage (V) | | Resistance (mΩcm$^2$) | | |
| | 90° peel strength (N/cm2) | Dimensional change (%) | 80° C. RH 100% 150 kPa | 80° C. RH 0% 175 kPa | 80° C. RH 100% 150 kPa | 80° C. RH 0% 175 kPa | Moistening-drying cycle test |
|---|---|---|---|---|---|---|---|
| Ex. 1 | 0.87 | 3 | 0.692 | 0.642 | 52 | 78 | ○ |
| Ex. 2 | 0.87 | 4 | 0.695 | 0.645 | 51 | 77 | ○ |
| Ex. 3 | 0.75 | 8 | 0.670 | 0.620 | 54 | 81 | ○ |
| Ex. 4 | — | — | 0.712 | 0.655 | 51 | 73 | ○ |
| Ex. 5 | 0.65 | 4 | 0.630 | 0.600 | 56 | 85 | ○ |
| Ex. 6 | — | 13 | 0.687 | 0.635 | 50 | 76 | X |
| Ex. 7 | — | 5 | 0.625 | 0.615 | 60 | 88 | X |
| Ex. 8 | 0.2 | 8 | 0.715 | 0.659 | 50 | 72 | X | machine preliminarily heated to 130° C. and hot-pressed for 3 minutes under a pressing pressure of 3 MPa to obtain a second laminate (C9) provided with sub-gaskets as shown in FIG. 5.

Carbon paper with water repellent treatment (H2315T10A, manufactured by NOK) was disposed on each side of the laminate (C9) provided with sub-gaskets to obtain a membrane/electrode assembly (D9) provided with sub-gaskets as shown in FIG. 3.

With respect to the membrane/electrode assembly (D9), the insulation resistance, the cell voltage and the resistance were measured. The results are shown in Tables 6 and 7.

Example 10

A second laminate (C10) and a membrane/electrode assembly (D10) provided with sub-gaskets were obtained in the same manner as in Example 9 except that the mass ratio of the vapor phase-grown carbon fiber to the polymer (H1) in the electrically conductive coating liquid (a) to be used for forming a reinforcing layer on the cathode side (vapor phase-grown carbon fiber/polymer (H1)) was changed to 1/0.7. The thickness of the reinforcing layer was about 70 μm.

With respect to the second laminate (C10), the dimensional change was measured. The results are shown in Table 6.

With respect to the membrane/electrode assembly (D10), the insulation resistance, the cell voltage and the resistance were measured. The results are shown in Tables 6 and 7.

Example 11

A second laminate (C11) and a membrane/electrode assembly (D11) provided with sub-gaskets were obtained in the same manner as in Example 9 except that the mass ratio of the vapor phase-grown carbon fiber to the polymer (H1) in the electrically conductive coating liquid (a) to be used for forming a reinforcing layer on an anode side (vapor phase-grown carbon fiber/polymer (H1)) was changed to 1/1. The thickness of the reinforcing layer was about 70 μm.

With respect to the second laminate (C11), the dimensional change was measured. The results are shown in Table 6.

With respect to the membrane/electrode assembly (D11), the insulation resistance, the cell voltage and the resistance were measured. The results are shown in Tables 6 and 7.

Example 12

A second laminate (C12) and a membrane/electrode assembly (D12) provided with sub-gaskets were obtained in the same manner as in Example 9 except that the average fiber diameter of the polypropylene non-woven fabric as the sheet-form reinforcing material was changed to 5 μm. The thickness of the reinforcing layer was about 65 μm.

With respect to the second laminate (C12), the dimensional change was measured. The results are shown in Table 6.

With respect to the membrane/electrode assembly (D12), the insulation resistance, the cell voltage and the resistance were measured. The results are shown in Tables 6 and 7.

Example 13

A second laminate (C13) and a membrane/electrode assembly (D13) provided with sub-gaskets were obtained in the same manner as in Example 9 except that the unit weight of the polypropylene non-woven fabric as the sheet-form reinforcing material was changed to 10 g/m². The thickness of the reinforcing layer was about 120 μm.

With respect to the second laminate (C13), the dimensional change was measured. The results are shown in Table 6.

With respect to the membrane/electrode assembly (D13), the insulation resistance, the cell voltage and the resistance were measured. The results are shown in Tables 6 and 7.

Example 14

A second laminate (C14) and a membrane/electrode assembly (D14) provided with sub-gaskets were obtained in the same manner as in Example 9 except that the thickness of the film of the polymer (Q2) as the polymer electrolyte membrane was changed to 15 μm. The thickness of the reinforcing layer was about 70 μm.

With respect to the second laminate (C14), the dimensional change was measured. The results are shown in Table 6.

With respect to the membrane/electrode assembly (D14), the insulation resistance, the cell voltage and the resistance were measured. The results are shown in Tables 6 and 7.

Example 15

A second laminate (C15) and a membrane/electrode assembly (D15) provided with sub-gaskets were obtained in the same manner as in Example 9 except that the thickness of the film of the polymer (Q2) as the polymer electrolyte membrane was changed to 10 μm. The thickness of the reinforcing layer was about 70 μm.

With respect to the second laminate (C15), the dimensional change was measured. The results are shown in Table 6.

With respect to the membrane/electrode assembly (D15), the insulation resistance, the cell voltage and the resistance were measured. The results are shown in Tables 6 and 7.

Example 16

A second laminate (C16) and a membrane/electrode assembly (D16) provided with sub-gaskets were obtained in the same manner as in Example 9 except that the thickness of the film of the polymer (Q2) as the polymer electrolyte membrane was changed to 5 μm. The thickness of the reinforcing layer was about 70 μm.

With respect to the second laminate (C16), the dimensional change was measured. The results are shown in Table 6.

With respect to the membrane/electrode assembly (D16), the insulation resistance, the cell voltage and the resistance were measured. The results are shown in Tables 6 and 7.

Example 17

On the surface of an ETFE film (AFLEX 100N, manufactured by Asahi Glass Company, Limited, thickness: 100 μm), the coating liquid (b) for a catalyst layer was applied by means of a die coater so that the amount of platinum would be 0.5 mg/cm², followed by drying for 15 minutes in a dryer at 80° C. to form a catalyst layer.

As the polymer electrolyte membrane, the film of the polymer (Q2) having a thickness of 20 μm obtained in step (I) in Example 9 was prepared.

The film of the polymer (Q2) and two ETFE films each provided with the catalyst layer were overlaid so that the film of the polymer (Q2) was in contact with the catalyst layers, and they were put in a pressing machine preliminarily heated to 130° C. and hot-pressed for 3 minutes under a pressing pressure of 3 MPa.

Immediately after being taken out from the pressing machine, the ETFE films were removed to obtain a membrane/catalyst layer assembly having an electrode area of 25 cm².

With respect to the membrane/catalyst layer assembly, the dimensional change was measured. The results are shown in Table 6.

A sub-gasket was disposed on each side of the membrane/catalyst layer assembly, and the assembly was put in a pressing machine preliminarily heated to 130° C. and hot-pressed for 3 minutes under a pressing pressure of 3 MPa to obtain a membrane/catalyst layer assembly provided with sub-gaskets.

Carbon paper with water repellent treatment (H2315T10A, manufactured by NOK) was disposed on each side of the membrane/catalyst layer assembly provided with sub-gaskets to obtain a membrane/electrode assembly (D17) provided with sub-gaskets.

With respect to the membrane/electrode assembly (D17), the insulation resistance, the cell voltage and the resistance were measured. The results are shown in Tables 6 and 7.

Example 18

Step (I)

Production of Film of Polymer (H2)

A polymer (H1) (EW: 910 g/equivalent) comprising units based on TFE and units (11) was dispersed in a mixed dispersion medium of water and ethanol to obtain a polymer (H1) dispersion having a solid content concentration of 20 mass %.

To the polymer (H1) dispersion, a solution having cerium nitrate dissolved in distilled water, was added to obtain a polymer (H2) dispersion wherein about 15% of sulfonic acid groups in the polymer (H1) were ion-exchanged by $Ce^{3+}$.

The polymer (H2) dispersion was applied on the surface of an ETFE film (AFLEX 100N, manufactured by Asahi Glass Company, Limited, thickness: 100 μm) by a die coater and dried for 15 minutes in a dryer at 80° C. and further subjected to thermal treatment for one hour in a dryer at 160° C. to obtain a film of the polymer (H2) (the polymer electrolyte membrane, thickness: 25 μm).

The EW and the proton conductivity of the film of the polymer (H2) were measured. The results are shown in Table 5.

TABLE 5

|  | Ex. 18 |
| --- | --- |
| Acid form polymer used | H1 |
| Obtained polymer | H2 |
| EW [g/equivalent] | 1050 |
| Proton conductivity [S/cm] | 0.04 |

Step (II) to Step (V)

A second laminate (C18) and a membrane/electrode assembly (D18) provided with sub-gaskets were obtained in the same manner as in Example 9 except that the film of the polymer (Q2) as the polymer electrolyte membrane was changed to the film of the polymer (H2). The thickness of the reinforcing layer was about 70 μm.

With respect to the second laminate (C18), the dimensional change was measured. The results are shown in Table 6.

With respect to the second membrane/electrode assembly (D18), the insulation resistance, the cell voltage and the resistance were measured. The results are shown in Tables 6 and 7.

Example 19

A second laminate (C19) and a membrane/electrode assembly (D19) were obtained in the same manner as in Example 18 except that the thickness of the film of the polymer (H2) as the polymer electrolyte membrane was changed to 15 μm. The thickness of the reinforcing layer was about 70 μm.

With respect to the second laminate (C19), the dimensional change was measured. The results are shown in Table 6.

With respect to the membrane/electrode assembly (D19), the insulation resistance, the cell voltage and the resistance were measured. The results are shown in Tables 6 and 7.

Example 20

A second laminate (C20) and a membrane/electrode assembly (D20) were obtained in the same manner as in Example 18 except that the thickness of the film of the polymer (H2) as the polymer electrolyte membrane was changed to 5 μm. The thickness of the reinforcing layer was about 70 μm.

With respect to the second laminate (C20), the dimensional change was measured. The results are shown in Table 6.

With respect to the membrane/electrode assembly (D20), the insulation resistance, the cell voltage and the resistance were measured. The results are shown in Tables 6 and 7.

Example 21

A second laminate (C21) and a membrane/electrode assembly (D21) provided with sub-gaskets were obtained in the same manner as in Example 9 except that the polymer electrolyte membrane was changed to a commercial product (NAFION (registered trademark) NRE211, manufactured by DU PONT, thickness: 25 μm). The thickness of the reinforcing layer was about 70 μm.

With respect to the second laminate (C21), the dimensional change was measured. The results are shown in Table 6.

With respect to the membrane/electrode assembly (D21), the insulation resistance, the cell voltage and the resistance were measured. The results are shown in Tables 6 and 7.

TABLE 6

|  | Dimensional change (%) | Insulation resistance (Ω/cm²) |
| --- | --- | --- |
| Ex. 9 | 3 | >2000 |
| Ex. 10 | 3 | >2000 |
| Ex. 11 | 3 | >2000 |
| Ex. 12 | 3 | >2000 |
| Ex. 13 | <3 | >2000 |
| Ex. 14 | 3 | >2000 |
| Ex. 15 | 3 | >2000 |
| Ex. 16 | 3 | >2000 |
| Ex. 17 | 13 | <500 |
| Ex. 18 | <3 | >2000 |
| Ex. 19 | <3 | >2000 |
| Ex. 20 | <3 | >2000 |
| Ex. 21 | <3 | >2000 |

TABLE 7

| | Current density 0.7 A/cm² | | | | | | Current density 2.0 A/cm² | | | |
|---|---|---|---|---|---|---|---|---|---|---|
| | Cell voltage (V) | | | Resistance (mΩcm²) | | | Cell voltage (V) | | Resistance (mΩcm²) | |
| | 80° C. RH 100% 150 kPa | 80° C. RH 20% 150 kPa | 80° C. RH 0% 175 kPa | 80° C. RH 100% 150 kPa | 80° C. RH 20% 150 kPa | 80° C. RH 0% 175 kPa | 95° C. RH 10% 150 kPa | 80° C. RH 0% 175 kPa | 95° C. RH 10% 150 kPa | 80° C. RH 0% 175 kPa |
| Ex. 9 | 0.731 | — | 0.694 | 41 | — | 54 | — | 0.559 | — | 54 |
| Ex. 10 | 0.689 | — | 0.702 | 41 | — | 52 | — | 0.562 | — | 52 |
| Ex. 11 | 0.730 | — | 0.697 | 44 | — | 58 | — | 0.560 | — | 58 |
| Ex. 12 | 0.741 | — | 0.694 | 50 | — | 77 | — | 0.566 | — | 56 |
| Ex. 13 | 0.703 | — | 0.690 | 52 | — | 81 | — | — | — | — |
| Ex. 14 | 0.743 | 0.727 | 0.706 | 36 | 48 | 67 | 0.509 | — | 51 | — |
| Ex. 15 | 0.748 | 0.732 | 0.709 | 33 | 42 | 61 | 0.550 | — | 41 | — |
| Ex. 16 | 0.752 | 0.740 | 0.720 | 33 | 38 | 56 | 0.583 | — | 36 | — |
| Ex. 17 | 0.731 | — | 0.695 | 37 | — | 65 | — | — | — | — |
| Ex. 18 | 0.717 | 0.689 | — | 48 | 74 | — | — | — | — | — |
| Ex. 19 | 0.725 | 0.715 | — | 39 | 62 | — | — | — | — | — |
| Ex. 20 | 0.740 | 0.734 | — | 35 | 46 | — | — | — | — | — |
| Ex. 21 | 0.711 | 0.672 | — | 55 | 114 | — | — | — | — | — |

INDUSTRIAL APPLICABILITY

The membrane/electrode assembly of the present invention is useful as a membrane/electrode assembly for polymer electrolyte fuel cell which is operated under a low humidity condition or in an environment where moistening, drying, etc. are repeated.

The entire disclosure of Japanese Patent Application No. 2008-074447 filed on Mar. 21, 2008 including specification, claims, drawings and summary is incorporated herein by reference in its entirety.

What is claimed is:

1. A membrane/electrode assembly for polymer electrolyte fuel cells, which comprises a cathode having a catalyst layer, an anode having a catalyst layer, and a polymer electrolyte membrane interposed between the catalyst layer of the cathode and the catalyst layer of the anode, wherein at least one of the cathode and the anode further has a reinforcing layer comprising a porous sheet-form reinforcing material made of a polymer, and an electrically conductive fiber,
wherein said sheet-form reinforcing material is made of a plurality of polymer fibers having an average fiber diameter of from 0.2 to 7 μm.

2. The membrane/electrode assembly for polymer electrolyte fuel cells according to claim 1, wherein each of the cathode and the anode further has a gas diffusion layer, and the reinforcing layer is present between the catalyst layer and the gas diffusion layer.

3. The membrane/electrode assembly for polymer electrolyte fuel cells according to claim 1, wherein the reinforcing layer contains a binder, and the binder is a fluorinated ion exchange resin.

4. The membrane/electrode assembly for polymer electrolyte fuel cells according to claim 3, wherein the mass ratio of the electrically conductive fiber to the binder (electrically conductive fiber/binder) is from 1/0.05 to 1/1.

5. The membrane/electrode assembly for polymer electrolyte fuel cells according to claim 4, which further has an interlayer in contact with the reinforcing layer.

6. The membrane/electrode assembly for polymer electrolyte fuel cells according to claim 4, wherein the polymer electrolyte membrane has a thickness of from 10 to 30 μm.

7. The membrane/electrode assembly for polymer electrolyte fuel cells according to claim 4, wherein the polymer electrolyte membrane has an equivalent weight of at most 900 g/equivalent.

8. The membrane/electrode assembly for polymer electrolyte fuel cells according to claim 4, wherein the polymer electrolyte membrane is a polymer electrolyte membrane made of a polymer (Q) which has repeating units represented by the following formula (U1) and repeating units represented by the formula (U2) and which has an equivalent weight of from 400 to 900 g/equivalent:

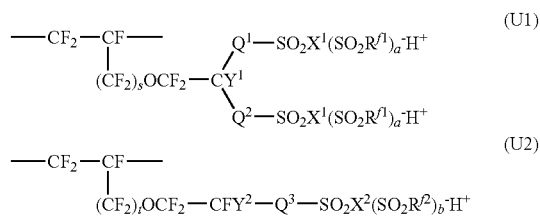

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

9. The membrane/electrode assembly for polymer electrolyte fuel cells according to claim 4, wherein the 90° peel strength at all interfaces present between the polymer electrolyte membrane and the reinforcing layer is at least 0.5 N/cm.

10. The membrane/electrode assembly for polymer electrolyte fuel cells according to claim 1, wherein the electrically conductive fiber is a carbon fiber, and the carbon fiber has an average fiber diameter of from 50 to 300 nm and an average fiber length of from 5 to 30 μm.

11. The membrane/electrode assembly for polymer electrolyte fuel cells according to claim 1, wherein the sheet-form reinforcing material is a non-woven fabric, and the non-woven fabric is a non-woven fabric made of a polypropylene or a fluoropolymer, produced by a melt-blown method.

12. The membrane/electrode assembly for polymer electrolyte fuel cells according to claim 1, which further has an interlayer in contact with the reinforcing layer.

13. The membrane/electrode assembly for polymer electrolyte fuel cells according to claim 1, wherein the polymer electrolyte membrane has a thickness of from 10 to 30 μm.

14. The membrane/electrode assembly for polymer electrolyte fuel cells according to claim 1, wherein the polymer electrolyte membrane has an equivalent weight of at most 900 g/equivalent.

15. The membrane/electrode assembly for polymer electrolyte fuel cells according to claim 1, wherein the polymer electrolyte membrane is a polymer electrolyte membrane made of a polymer (Q) which has repeating units represented by the following formula (U1) and repeating units represented by the formula (U2) and which has an equivalent weight of from 400 to 900 g/equivalent:

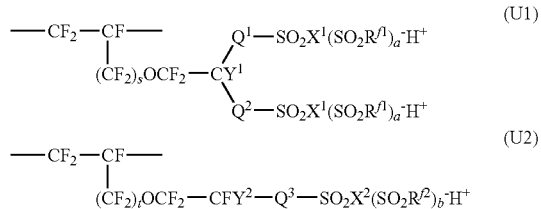

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

16. The membrane/electrode assembly for polymer electrolyte fuel cells according to claim 1, wherein the 90° peel strength at all interfaces present between the polymer electrolyte membrane and the reinforcing layer is at least 0.5 N/cm.

17. The membrane/electrode assembly for polymer electrolyte fuel cells according to claim 1, which further has a frame-form sub-gasket disposed at the periphery of the membrane/electrode assembly for polymer electrolyte fuel cells.

18. A polymer electrolyte fuel cell having a membrane/electrode assembly for polymer electrolyte fuel cells, which comprises a cathode having a catalyst layer, an anode having a catalyst layer, and a polymer electrolyte membrane interposed between the catalyst layer of the cathode and the catalyst layer of the anode, wherein at least one of the cathode and the anode further has a reinforcing layer comprising a porous sheet-form reinforcing material made of a polymer, and an electrically conductive fiber; each of the cathode and the anode further has a gas diffusion layer, and the reinforcing layer is present between the catalyst layer and the gas diffusion layer, wherein said sheet-form reinforcing material is made of a plurality of polymer fibers having an average fiber diameter of from 0.2 to 7 μm; and power generation is carried out by feeding a reaction gas having a relative humidity of at most 25%.

19. The polymer electrolyte fuel cell according to claim 18, wherein the reinforcing layer contains a binder, and the binder is a fluorinated ion exchange resin.

20. The polymer electrolyte fuel cell according to claim 19, wherein the mass ratio of the electrically conductive fiber to the binder (electrically conductive fiber/binder) is from 1/0.05 to 1/1.

21. The polymer electrolyte fuel cell according to claim 20, which further has an interlayer in contact with the reinforcing layer.

22. The polymer electrolyte fuel cell according to claim 20, wherein the polymer electrolyte membrane has a thickness of from 10 to 30 μm.

23. The polymer electrolyte fuel cell according to claim 20, wherein the polymer electrolyte membrane has an equivalent weight of at most 900 g/equivalent.

24. The polymer electrolyte fuel cell according to claim 20, wherein the polymer electrolyte membrane is a polymer electrolyte membrane made of a polymer (Q) which has repeating units represented by the following formula (U1) and repeating units represented by the formula (U2) and which has an equivalent weight of from 400 to 900 g/equivalent:

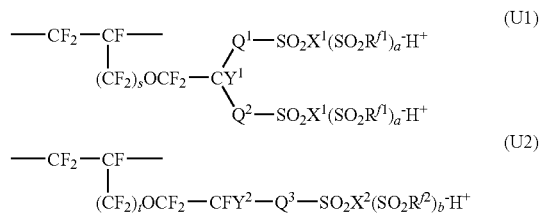

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

25. The polymer electrolyte fuel cell according to claim 20, wherein the 90° peel strength at all interfaces present between the polymer electrolyte membrane and the reinforcing layer is at least 0.5 N/cm.

26. The polymer electrolyte fuel cell according to claim 18, wherein the electrically conductive fiber is a carbon fiber, and the carbon fiber has an average fiber diameter of from 50 to 300 nm and an average fiber length of from 5 to 30 μm.

27. The polymer electrolyte fuel cell according to claim 18, wherein the sheet-form reinforcing material is a non-woven fabric, and the non-woven fabric is a non-woven fabric made of a polypropylene or a fluoropolymer, produced by a melt-blown method.

28. The polymer electrolyte fuel cell according to claim 18, which further has an interlayer in contact with the reinforcing layer.

29. The polymer electrolyte fuel cell according to claim 18, wherein the polymer electrolyte membrane has a thickness of from 10 to 30 μm.

30. The polymer electrolyte fuel cell according to claim 18, wherein the polymer electrolyte membrane has an equivalent weight of at most 900 g/equivalent.

31. The polymer electrolyte fuel cell according to claim 18, wherein the polymer electrolyte membrane is a polymer electrolyte membrane made of a polymer (Q) which has repeating units represented by the following formula (U1) and repeating units represented by the formula (U2) and which has an equivalent weight of from 400 to 900 g/equivalent:

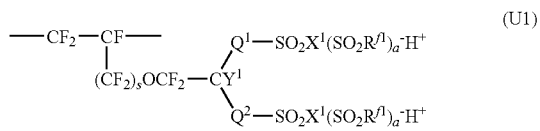
(U1)

-continued

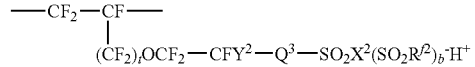
(U2)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

32. The polymer electrolyte fuel cell according to claim 18, wherein the 90° peel strength at all interfaces present between the polymer electrolyte membrane and the reinforcing layer is at least 0.5 N/cm.

33. The polymer electrolyte fuel cell according to claim 18, which further has a frame-form sub-gasket disposed at the periphery of the membrane/electrode assembly for polymer electrolyte fuel cells.

* * * * *